United States Patent [19]

Hughes et al.

[11] Patent Number: 5,963,186

[45] Date of Patent: Oct. 5, 1999

[54] MULTIPLEX ADDRESSING OF FERRO-ELECTRIC LIQUID CRYSTAL DISPLAYS

[75] Inventors: Jonathan Rennie Hughes, Worcester; Edward Peter Raynes, Malvern, both of United Kingdom

[73] Assignee: The Secretary of State for Defence in Her Britannic Majesty's Government of the United Kingdom of Great Britain and Northern Ireland, Hants, United Kingdom

[21] Appl. No.: 08/902,519

[22] Filed: Jul. 29, 1997

Related U.S. Application Data

[63] Continuation of application No. 07/977,442, Feb. 23, 1993, abandoned.

[30] Foreign Application Priority Data

Aug. 7, 1990 [GB] United Kingdom .................... 9017316
Jul. 26, 1991 [WO] WIPO ...................... PCT/GB91/01263

[51] Int. Cl.⁶ ...................................................... G09G 3/36
[52] U.S. Cl. ................................................ 345/94; 345/99
[58] Field of Search ................................ 345/94–97, 99; 349/33

[56] References Cited

U.S. PATENT DOCUMENTS

| | | | |
|---|---|---|---|
| 4,649,383 | 3/1987 | Takeda et al. | 340/784 |
| 4,830,466 | 5/1989 | Matsuhashi et al. | 340/784 |
| 4,962,376 | 10/1990 | Inoue et al. | 340/784 |

FOREIGN PATENT DOCUMENTS

| | | |
|---|---|---|
| 0 197 742 | 10/1986 | European Pat. Off. . |
| 0 306 203 | 3/1989 | European Pat. Off. . |
| 0 378 293 | 7/1990 | European Pat. Off. . |
| 2 146 473 | 4/1985 | United Kingdom . |
| 2 173 336 | 10/1986 | United Kingdom . |
| 2 173 337 | 10/1986 | United Kingdom . |
| 2 173 629 | 10/1986 | United Kingdom . |
| WO 89/05025 | 6/1989 | WIPO . |

OTHER PUBLICATIONS

Asai et al, "A 6.7–in. Square High–Resolution Full–Color TFT–LCD," Japan Display, 1989, pp. 514–517.
Asai et al., "A 6.7–in. Square High–Resolution Full–Color . . . ", Japan Display, 1989, pp. 514–517.
Harada et al., "An Application of Chiral Smectic–C . . . ", SID 85 Digest, 1985, pp. 131–134.

(List continued on next page.)

*Primary Examiner*—Amare Mengistu
*Attorney, Agent, or Firm*—Nixon & Vanderhye P.C.

[57] ABSTRACT

A ferro-electric liquid crystal cell is addressed by row and column electrodes forming an x,y matrix of display elements. A strobe waveform is applied to each row in sequence while appropriate data waveforms are applied to all the column electrodes. At each display element the material receives an addressing waveform to switch it to one of its two switched states depending upon the polarity of the addressing waveform. The switching characteristics of ferro-electric materials depend upon the shape of the addressing waveform. Two different shapes of addressing waveforms are used to produce two different and separated switching characteristics (FIG. 3). Al least one switching characteristic curve may exhibit a minimum response time at one voltage value, and the display is operated at voltages above this. The data waveforms are alternating positive and negative pulses of period 2ts. The strobe waveform has a zero for one time period ts followed by a unipolar voltage pulse of duration greater than ts, e.g. 1.5ts or more. This results in an overlapping of addressing in adjacent rows, i.e. the end of a strobe pulse on one row overlaps with the beginning of a strobe pulse on the next row. The display elements may be switched into one of their two states by one of two strobe pulses of opposite polarity. Alternatively a blanking pulse may switch all elements to one state and a strobe used to switch selected elements to the other state.

20 Claims, 29 Drawing Sheets

OTHER PUBLICATIONS

Jones et al., "The Importance of Dielectric Biaxiality . . . ", Ferroelectrics, vol. 121, 1991, pp. 91–102.

Lagerwall et al., "Ferroelectric Liquid Crystals for Displays", IEEE 1985 International Display Research Conference, pp. 213–221.

Maltese et al., "Fast Addressing Modes for Ferroelectric . . . ", IEEE 1988 International Display Research Conference, pp. 98–146.

Raynes, E. P., The Physics of Displays for the 1990's, Fine Chemicals for the Electronics Industry II, Chemical Applications for the 1990's, pp. 130–146.

Harada et al.; SID 85 Digest; 1985; "An Application of Chiral Smectic–C Liquid Crystal to a Mutiplexed Large–Area Display;" pp. 131–134.

Lagerwall et al.; IEEE 1985 International Display Research Conference; "Ferroelectric Liquid Crystals for Displays;" pp. 213–221.

Maltese et al.; IEEE 1988 International Display Research Conference; "Fast Addressing Modes for Ferroelectric LC Display Panels;" pp. 98–146.

Jones et al.; Ferroelectrics, 1991, vol. 121; "The Importance of Dielectric Biaxiality for Ferroelectric Liquid Crystal Devices;" pp. 91–102.

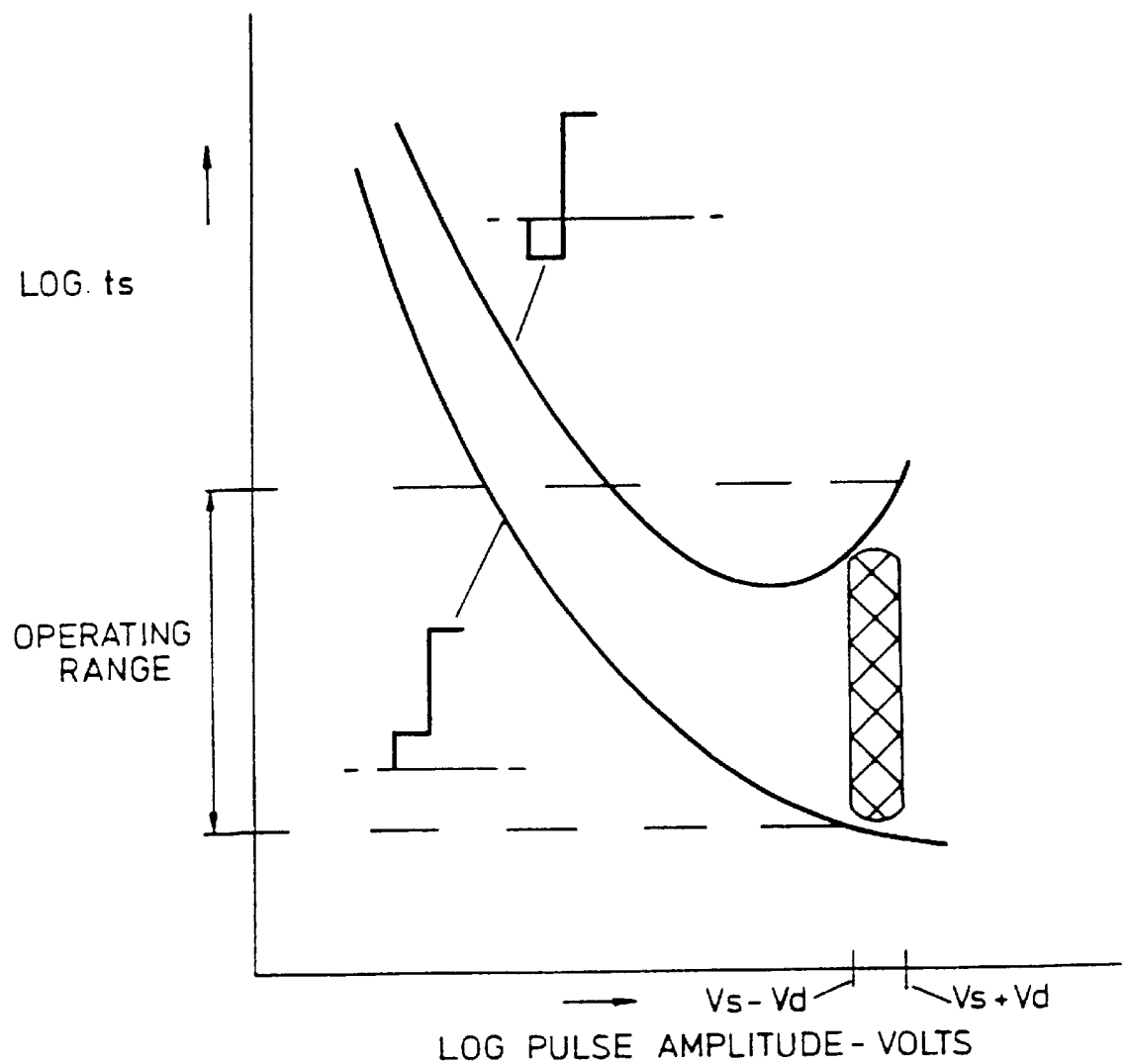

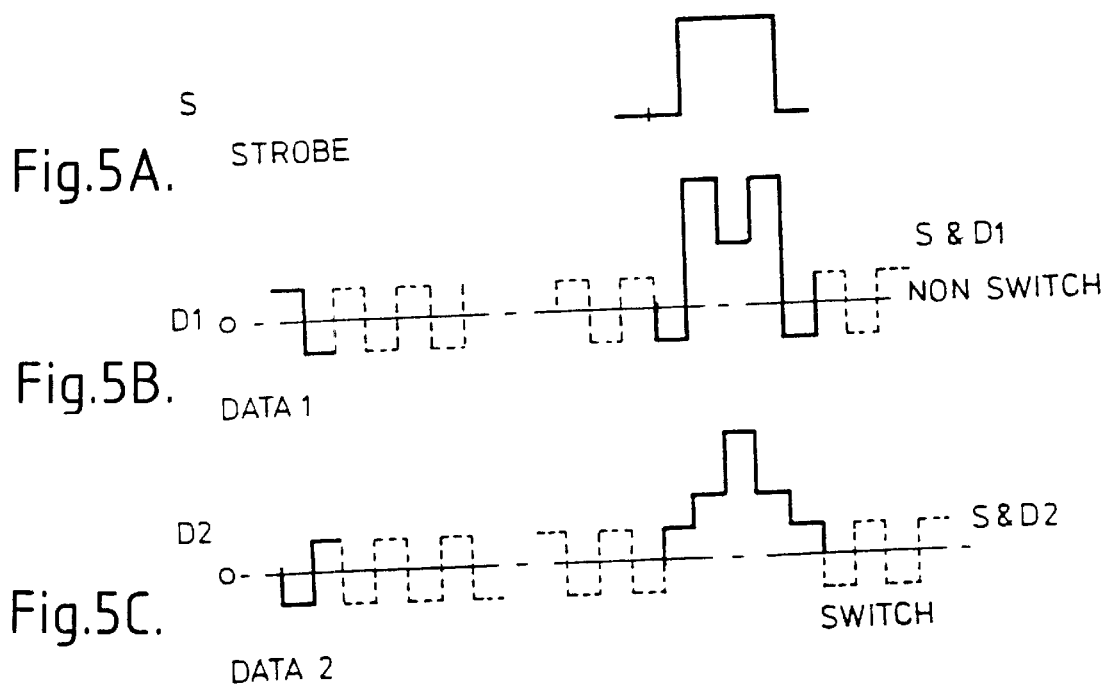

S
STROBE

DATA 1

DATA 2    SWITCH

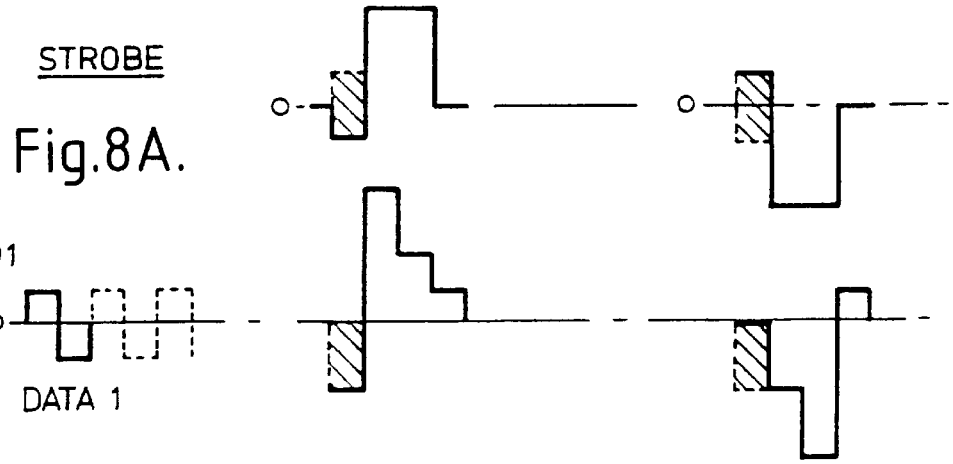
Fig.8A.
Fig.8B.
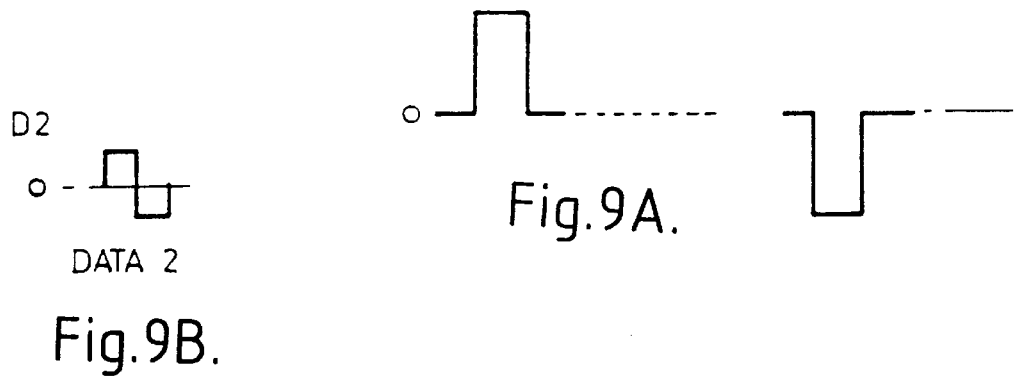
Fig.9A.
Fig.9B.
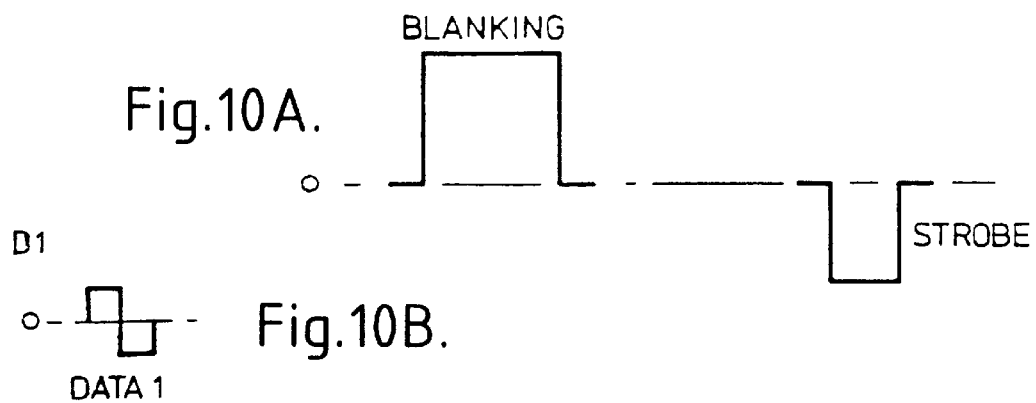
Fig.10A.
Fig.10B.

PRIOR ART  MONO PULSE

COLUMN WAVEFORM

COLUMN WAVEFORM

COLUMN WAVEFORM

MULTIPLEX ADDRESSING OF FERRO-ELECTRIC LIQUID CRYSTAL DISPLAYS

This application is a continuation of application Ser. No. 07/977,442, filed Feb. 23, 1993 now abandoned.

BACKGROUND OF THE INVENTION

1. Field of the Invention

This invention relates to multiplex addressing of ferro-electric liquid crystal displays. Such displays use a tilted chiral smectic C. I. or F liquid crystal material.

2. Discussion of Prior Art

Liquid crystal devices commonly comprise a thin layer of a liquid crystal material contained between two glass slides. Optically transparent electrodes are formed on the inner surface of both slides. When an electric voltage is applied to these electrodes the resulting electric field changes the molecular alignment of the liquid crystal molecules. The changes in molecular alignment are readily observable and form the basis for many types of liquid crystal display devices.

In ferro electric liquid crystal devices the molecules switch between two different alignment directions depending on the polarity of an applied electric field. These devices have a degree of bistability and tend to remain in one of the two switched states until switched to the other switched state. This allows the multiplex addressing of quite large displays.

One common multiplex display has display elements, ie pixels, arranged in an x, y matrix format for the display of e.g., alpha numeric characters. The matrix format is provided by forming the electrodes on one slide as a series of column electrodes, and the electrodes on the other slide as a series of row electrodes. The intersections between each column and row form addressable elements or pixels. Other matrix layout are known, e.g. polar co-ordinate (r–θ), and seven bar numeric displays.

There are many different multiplex addressing schemes. A common feature is application of a voltage, called a strobe voltage to each row or line in sequence. Coincidentially with the strobe applied at each row, appropriate voltages, called data voltages, are applied to all column electrodes. The differences between the different schemes lies in the shape of the strobe and data voltage waveforms.

European Patent Application 0,306,203 describes one multiplex addressing scheme for ferro electric liquid crystal displays. In this application the strobe is a unipolar pulse of alternating polarity, and the two data waveforms are rectangular waves of opposite sign. The strobe pulse width is one half the data waveform period. The combination of the strobe and the appropriate one of the data voltages provides a switching of the liquid crystal material.

Other addressing schemes are described in GB 2,146,473-A; GB-2,173,336A; GB-2,173,337-A; GB-2,173,629-A; WO 89/05025 ; Harada et al 1985 S.I.D Digest Paper 8.4 pp 131–134; and Lagerwall et al 1985 IEEE, IDRC pp 213–221; Proc 1988 IEEE, IDRC p 98–101 Fast Addressing for Ferro Electric LC Display Panels, P Maltese et al.

The scheme disclosed in GB -2,173,336A (EP 0197742) inventor Ayliffe, uses two data waveforms of rectangular shape and opposite sign with a period of two time slots (2ts). A strobe is a single pulse of one time slot duration and its is combined with the first half of a data waveform to cause selective switching in the first time slot. Prior to this selective switching each line is blanked by a blanking pulse. Such a blanking pulse or pulses may immediately precede the strobe so that a modified strobe waveform is formed. However, such a modified strobe waveform is merely a blanking immediately followed by a strobe pulse and it is the strobe pulse that combines with a selected data to cause selective switching.

The material may be switched between its two states by two strobe pulses of opposite sign, in conjunction with a data waveform. Alternatively, a blanking pulse may be used to switch the material into one state, and a single strobe pulse used with an appropriate data pulse to selectively switch back pixels to the other state. Periodically the sign of the blanking and the strobe pulses are alternated to maintain a net zero d.c. value.

These blanking pulses are normally greater in amplitude and length of application than the strobe pulses so that the material switches irrespective of which of the two data waveforms is applied to any one intersection. Blanking pulses may be applied on a line by line basis ahead of the strobe, or the whole display may be blanked at one time, or a group of lines may be simultaneously blanked.

One known blanking scheme uses blanking pulse of equal voltage (V) time (t) product Vt, but opposite polarity, to the strobe pulse Vt product. The blanking pulse has an amplitude of half and a time of application of twice that of the strobe pulse. These values ensure the blanking and strobe have a net zero d.c. value without periodic reversal of polarity. Experimental use has shown the scheme to have a poor performance.

Another known scheme with a blanking pulse is described in EP 0,378,293. This uses a conventional d.c. balanced strobe pulse (of equal periods of opposite polarity) with a similar d.c. balanced blanking pulse (of equal periods of opposite polarity) in which the width of the blanking pulse may be several times that of the strobe pulse. Such a scheme has a net zero d.c. value without periodic reversal of polarity of blanking and strobe waveforms.

The feature of d.c. balance is particularly important in projection displays since if it is desired to switch the gap between pixels to one optical state then periodic reversal of polarities is not permissible.

One problem with existing displays is the time taken to address complex displays. In order to drive complex displays at video frame rates it is necessary to address the display quickly. Contrast ratio can also be improved by addressing quickly so that the column waveform is at a correspondingly high frequency. However, merely increasing the speed of addressing will not always result in correct switching. An object of the present invention is to reduce the time taken to address a matrix display and to improve display contrast.

SUMMARY OF THE INVENTION

According to this invention a method of multiplex addressing a ferro electric liquid crystal matrix display formed by the intersections of a first set of electrodes and a second set of electrodes comprises the steps of:

addressing each electrode individually in the first set of electrodes, such addressing being either by application of a strobe waveform of pulses of positive and negative values, or by application of a blanking pulse followed by a strobe pulse with periodic polarity reversal to maintain a net zero d.c. value, applying one of two data waveforms to each electrode in the second set of electrodes synchronised with the strobe waveform, both data waveforms being of alternating positive and negative values with one data waveform the inverse of the other data waveform, the period of the data waveforms (2ts) being twice that of a single strobe pulse (ts), Characterised by: extending in time the end of each strobe pulse, whereby each intersection is addressed with a pulse of appropriate sign and magnitude to turn that intersection to a desired display state once per complete display address period and an overall net zero d.c. value.

The strobe waveform may be first a zero in the first period, ts, followed by a non zero voltage (main) pulse for a period greater than ts, eg (1.5. 2.0. 2.5. 3.0 or more)×ts. The strobe waveform may have a non zero voltage in the first ts period of the same or different polarity to the remainder of the strobe; this first voltage pulse being of variable amplitude to provide a temperature compensation. The strobe waveform may be followed by a non zero voltage for a time period of opposite polarity to the main voltage pulse, eg greater than ts, ts, or less than ts.

The liquid crystal material may be switched between its two states by coincidence of a strobe pulse and an appropriate data waveform. Alternatively the material may be switched into one of its state by a blanking pulse and subsequently selected pixels switched back to the other state by coincidence of a strobe pulse and an appropriate data waveform;

The blanking pulse may be in two parts; a first part of opposite polarity to the second. Both parts of the blanking pulse are arranged to have a voltage time product Vt that combines with the Vt product of the single strobe to give a net zero d.c. value.

Extending the time length of the strobe pulse means an overlapping of addressing in sucessive electrodes in the first set of electrodes. Such overlapping effectively increases the width of the switching pulse whilst not affecting the other waveforms and thus reduces the total time taken to address a complete display whilst maintaining a good contrast ratio between elements in the two different switched states.

Each strobe pulse may be immediately preceded by a smaller prepulse of the same or opposite sign to that of the associated strobe pulse. This prepulse may be used to change the switching characteristics of the liquid crystal material. It may be used as part of a temperature compensation. In this case the temperature of the material is sensed and the amplitude of the prepulse adjusted as appropriate.

Each strobe pulse may be immediately followed by a pulse of opposite sign.

According to this invention a multiplex addressed liquid crystal display comprises:

a liquid crystal cell formed by a layer of liquid crystal material contained between two cell walls, the liquid crystal material being a tilted chiral smectic material having a negative dielectric anisotropy, the cell walls carrying electrodes formed as a first series of electrodes on one wall and a second series of electrodes on the other cell walls, the electrodes being arranged to form collectively a matrix of addressable intersections, at least one of the cell walls being surface treated to provide surface alignment to liquid crystal molecules along a single direction;

driver circuits for applying a strobe waveform in sequence to each electrode in the first set of electrodes;

driver circuits for applying data waveforms to the second set of electrodes;

waveform generators for generating a strobe waveform, and two data waveforms for applying to the driver circuits;

and means for controlling the order of data waveforms so that a desired display pattern is obtained;

Characterised by: a data waveform generator that generates two sets of waveforms of equal amplitude and frequency but opposite sign, each data waveform comprising d.c. pulses of alternate sign, and a strobe generator that generates a strobe pulse of greater duration than one half a data waveform period, each strobe pulse extending into an address period of the next electrode.

A simple analysis of the liquid crystal switching behaviour (Liquid Crystal, 1989, vol 6, No 3, pp 341–347) yields the following expression for the field at which the response time—voltage switching characteristic of the liquid crystal material exhibits a minimum response time.

$$Emin = \frac{P_S}{\sqrt{3} \cdot \epsilon_o |\Delta\epsilon| \sin^2 \theta} \qquad \text{equation (1)}$$

where Emin is the field at which the response time-voltage switching characteristic of the liquid crystal material exhibits a minimum response time,
$\epsilon_o$ is the permittivity of free space $\Delta\epsilon$ is the (negative) dielectric anisotropy of the liquid crystal material
$\theta$ is the cone angle of the liquid crystal material
Ps is the spontaneous polarisation.

This simple analysis holds true for only some materials and their values of Ps and $\Delta\epsilon$ can be adjusted to achieve desired operating voltages. Recent work (ref. E P Raynes, The Physics of Displays for the 1990's, in Fine Chemicals for the Electronics Industry II, Chemical Applications for the 1990's, pp 130–146; Jones, Raynes, and Towler, The Importance of Dielectric Biaxiality for Ferro electric Liquid Crystal Devices, 3rd International Coference on Ferro electric Liquid Crystals, Univ of Boulder Colo. USA 24–28 Jun., 1991) has shown that the dielectric biaxiality is important for the existence of a minimum in the response time—voltage characteristic. The data for FIGS. 16–20 described below were obtained experimentally.

BRIEF DESCRIPTION OF THE DRAWINGS

The invention will now be described by way of example only with reference to the accompanying drawings of which:

FIG. 3 is a graph of log time against log voltage showing switching characteristics of a smectic material for two differently shaped addressing waveforms;

FIGS. 4A, 4B, 4C, 5A, 5B, 5C, 6A, 6B, 7A, 7B, 7C, 8A and 8B show different strobe and data waveform diagrams that can be used;

FIGS. 9A and 9B show waveform diagrams having a strobe modified from that of FIGS. 4A, 4B, 4C;

FIGS. 10A and 10B show blanking, strobe and data waveforms diagrams,

FIGS. 12A-1, 12A-2, 12A-3, 12A-4, 12A-5, 12A-6, 12A-7, 12A-8, 12A-9, 12A-10, 12B-1, 12B-2, 12B-3 and 12B-4 show waveform diagrams for addressing the 4×4 element display shown in FIG. 13;

DETAILED DESCRIPTION OF PREFERRED EMBODIMENTS

Figure 1:
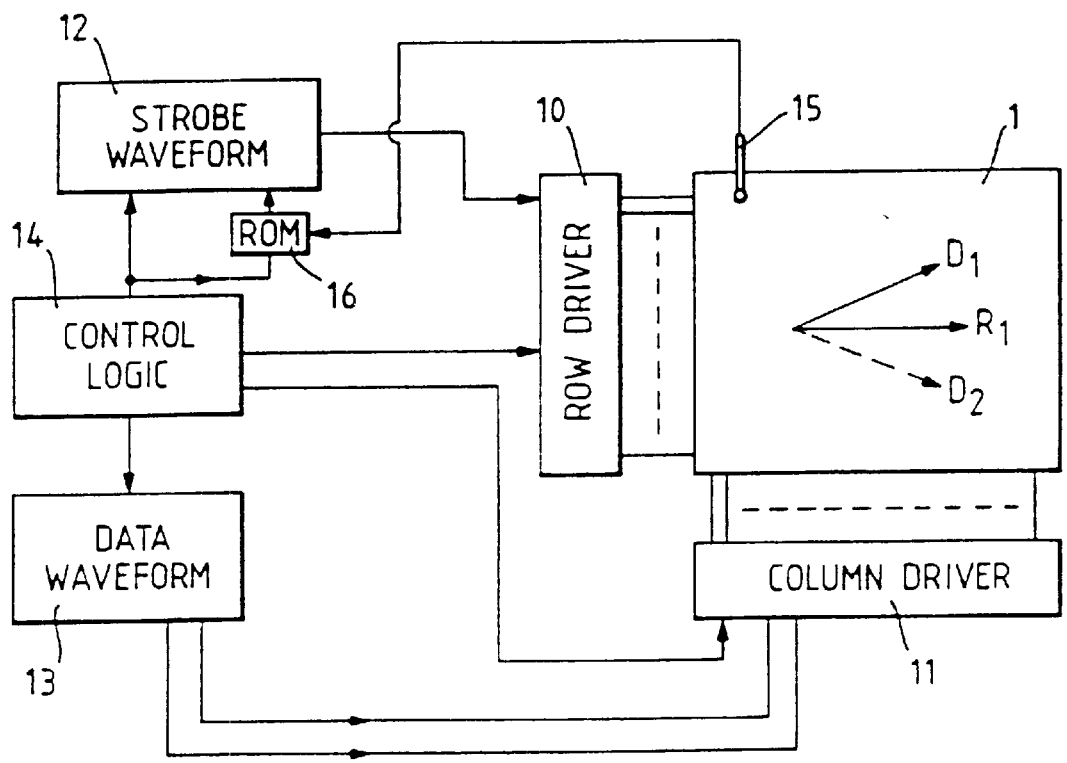
FIG. 1 is a diagrammatic view of a time multiplex addressed x, y matrix.
Figure 2:
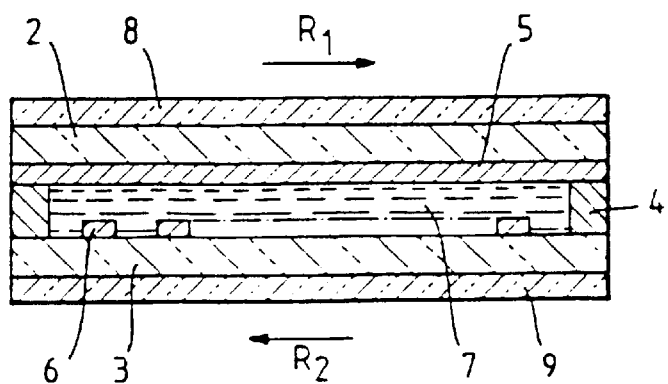
FIG. 2 is a cross section of part of the display of FIG. 1 to an enlarged scale.

The display 1 shown in FIGS. 1, 2 comprises two glass walls 2, 3 spaced about 1–6 μm apart by a spacer ring 4 and/or distributed spacers.

Electrode structures 5, 6 of transparent tin oxide are formed on the inner face of both walls. These electrodes are shown as row and column forming an X, Y matrix but may be of other forms. For example, radial and curved shape for an r, θ display, or of segments form for a digital seven bar display.

A layer 7 of liquid crystal material is contained between the walls 2, 3 and spacer ring 4.

Polarisers 8, 9 are arranged in front of and behind the cell 1. Row 10 and column 11 drivers apply voltage signals to the cell. Two sets of waveforms are generated for supplying the row and column drivers 10, 11. A strobe wave form generator 12 supplies row waveforms, and a data waveform generator 13 supplies ON and OFF waveforms to the column drivers 11. Overall control of timing and display format is controlled by a control logic unit 14. Temperature of the liquid crystal layer 7 is measured by a thermocouple 15 whose output is fed to the strobe generator 12. The thermocouple 15 output may be direct to the generator or via a proportioning element 16 e.g. a programmed ROM chip to vary one part of the strobe pulse and or data waveform.

Prior to assembly the cell walls are surface treated in a known manner, e.g. by applying a thin layer of polyimide or polyamide, drying and, where appropriate, curing and buffing with a cloth (e.g. rayon) in a single direction, R1, R2. Alternatively a thin layer of e.g. silicon monoxide may be evaporated at an oblique angle. These treatments provide a surface alignment for the liquid crystal molecules. The alignment/rubbing directions R1, R2 may be parallel or anti parallel. When suitable unidirectional voltages are applied the molecules director align along one of two directions D1, D2 depending on polarity of the voltage. Ideally the angle between D1, D2 is about 45°. In the absence of an applied electric field the molecules adopt an intermediate alignment direction between R1, R2 and the directions D1, D2.

The device may operate in a transmissive or reflective mode. In the former light passing through the device e.g. from a tungsten bulb is selectively transmitted or blocked to form the desired display. In the reflective mode a mirror is placed behind the second polariser 9 to reflect ambient light back through the cell 1 and two polarisers. By making the mirror partly reflecting the device may be operated both in a transmissive and reflective mode.

Pleochroic dyes may be added to the material 7. In this case only one polariser is needed and the layer thickness may be 4–10 μm.

Suitable liquid crystal materials are:

Merck catalogue reference number SCE 8 (available from Merck Ltd Poole. England) which has a Ps Polarization Coefficient of about 5nC/square cm at 30° C. a dielectric anisotropy of about −2.0. and a phase sequence of: Sc 59° C. Sa 79° C. N 98° C.

Mixture A which contains 5% racemic dopant and 3% chiral dopant in the host;

Mixture B which contains 9.5% racemic dopant and 3.5% chiral dopant in the host.

Host

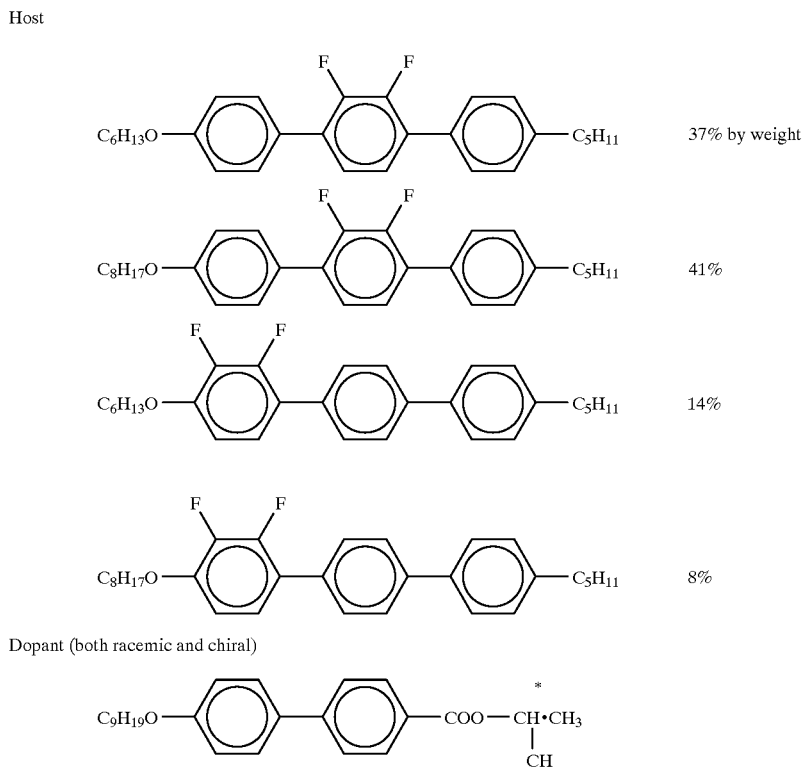

Dopant (both racemic and chiral)

The * denotes chirality, without it the material is racemic.

Both mixtures A, B have a Ps of about 7nC/square cm at 30° C. and a dielectric anisotropy of about −2.3.

Mixture A has the phase sequence Sc 100° C. Sa 111° C. N 136° C.

Mixture B has the phase sequence Sc 87° C. Sa 118° C. N 132° C.

Figures 1, 12A:
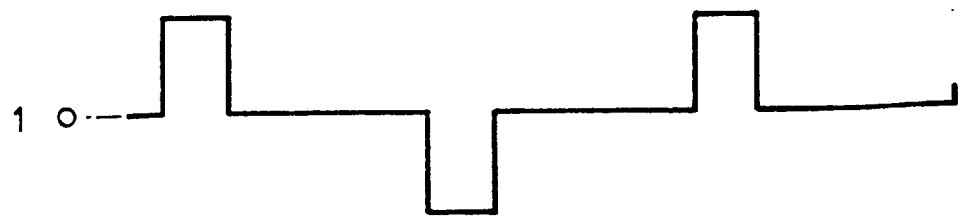
Figures 2, 12A:
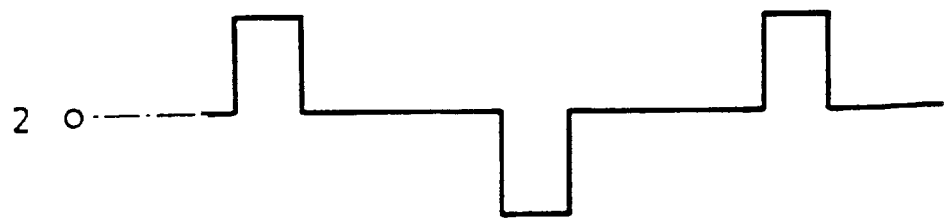
Figures 3, 12A:
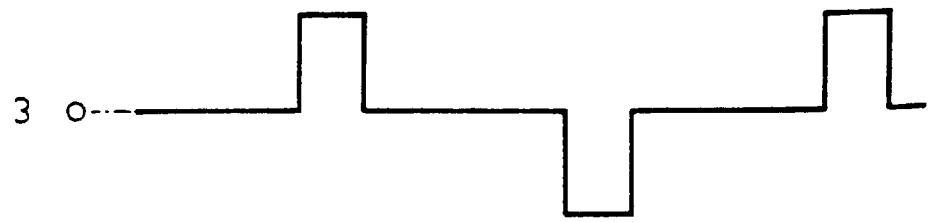
Figures 4, 12A:
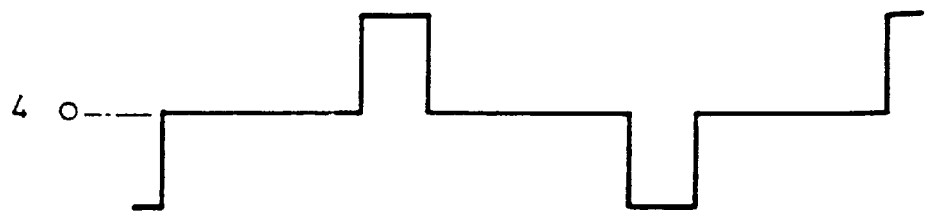

Liquid crystal material at an intersection of a row and column electrode is switched by application of an addressing voltage. This addressing voltage is obtained by the combination of applying a strobe waveform Vs to the row electrode, and a data waveform Vd to the column electrode.

ie: $V_r = V_s - V_d$ where $V_r$=instantaneous value of addressing waveform
$V_s$=instantaneous value of strobe waveform, and
$V_d$=instantaneous value of data waveform Chiral tilted smectic materials switch on the product of voltage and time. This characteristic is shown in FIG. 3. Voltage time products above the curve will switch a material; below the curve is a non-switching regime. Note, the switching characteristic is independent of the sign of the voltage; i.e. the material switches for either a positive or a negative voltage of a given amplitude. The direction to which the materal switches is dependent on the polarity of voltage.

Two curves are shown in FIG. 3 because the switching characteristic depends upon the shape of the addressing voltage pulse combination. The upper curve is obtained when the addressing voltage is immediately preceded by a small prepulse of opposite sign; e.g. a small negative pulse followed by a larger positive pulse. The material behaves the same on application of a small positive pulse followed by a large negative pulse. This upper curve usually exhibits a turn round or a minimum response time at one voltage. This is not as given by equation 1, since the switching behaviour is modified by the prepulse. The small prepulse may be termed a leading pulse (Lp) and the larger addressing pulse a trailing pulse (Tp). The upper curve applies for a negative value of the ratio Lp/Tp.

The lower curve is obtained when the addressing voltage is immediately preceded by a small pre-pulse of the same sign; i.e. a small positive pulse followed by a larger positive pulse. The same applies for a small negative pulse followed by a large negative pulse. The lower curve has a positive Lp/Tp ratio. This lower curve has a different shape to that of the upper curve; for some materials it may not have a minimum value of a voltage time curve.

The difference in shape between the two curves allows a device to be operated without ambiguity over quite a wide range of time values. This is obtained by operating a device in a regime between the two curves e.g. as shown in hatched lines. Intersections required to be switched are addressed by an addressing voltage having a shape where the lower curve applies and where the voltage and pulse width lie above the curve. Intersections not requiring to be switched either receive an addressing voltage having the shape where the upper curve applies, and where the voltage and pulse width li e below the curve, or only receive a data waveform voltage. This is described in more detail below.

Figure 4A:
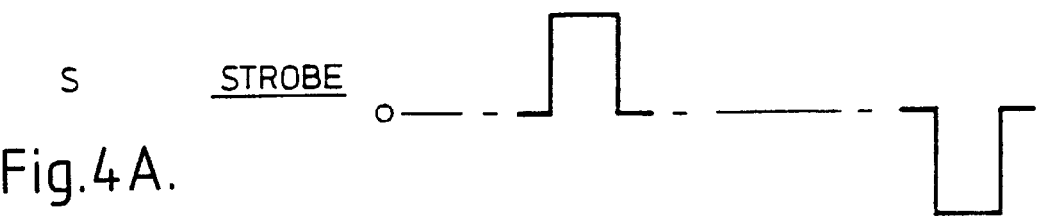
Figure 4B:
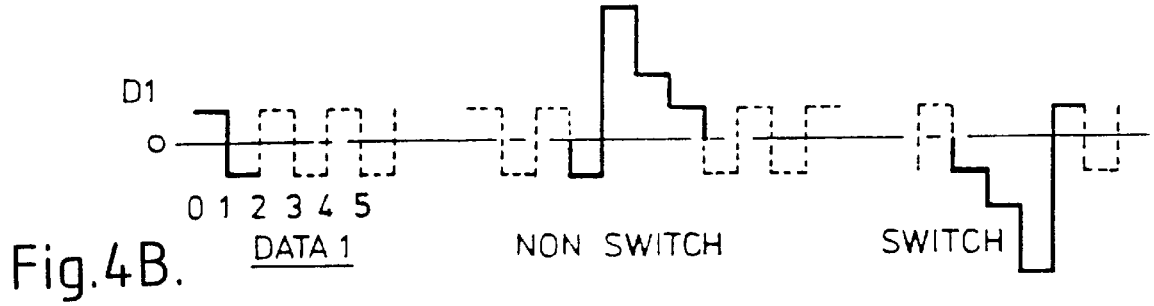
Figure 4C:
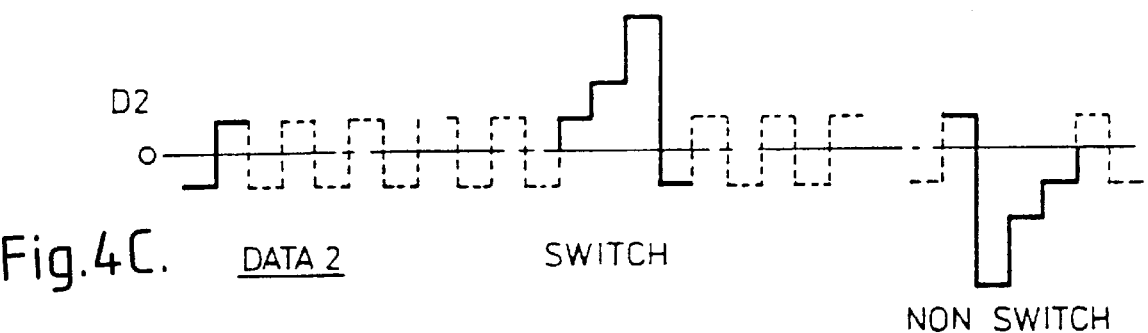

FIGS. 4A, 4B, 4C show strobe, data, and addressing waveforms of one embodiment of the present invention. The strobe waveform is first a zero for a time period ts followed by +3 for twice ts. This is applied to each row in sequence, i.e. one time frame period. The second part of the strobe is a zero for one ts period followed by 3 for twice ts. Again this is applied to each row in sequence for one time frame period. Complete addressing of a display takes two time frame periods. The values of +3, −3 are units of voltage given for the purpose of illustration, actual values are given later for specific materials, Data waveforms are arbitrarily defined as data ON and data OFF, or D1. and D2. Data ON has first a value of +1 for a first time period of to followed by a −1 for a time period ts. This is repeated; i.e. data ON is an alternating signal of amplitude 1 and period 2ts. Data OFF is similar but has an inital value of −1 followed by +1; i.e. the inverse of data ON. The first part of the data waveform, e.g. for data ON the value or +1 for a time period ts, is coincident with the first part of the strobe waveform, i.e. zero for time period ts.

The addressing waveform is the sun of strobe and data. The combination of a positive strobe pulse and data ON is : +1, 4, 2, 1, −1, 1 etc. The value 4 immediately preceded by −1 ensures the material switch characteristics are governed by the upper curve of FIG. 3. The combination of a negative strobe pulse and data ON is: −1, −2, −4, 1, −1. 1 etc. The combination of smaller pulses or the same sign as the large (−4) pulse ensures the material switch characteristics are governed by the lower curve in FIG. 3. Similarly a positive strobe pulse and data OFF combine to give: 1, 2, 4, −1, 1 etc; and a negative strobe pulse and data OFF combine to give: 1, −4, −2, −1, 1, −1 etc.

When not receiving a strobe pulse each row is grounded, i.e. receives a zero voltage. Each column receives either data ON or data OFF throughout. The effect is that all intersections receive an alternating signal, caused by the data waveforms, when not being addressed. This provides an a.c. bias to each intersection and helps maintain material in its switched state. Larger amounts of a.c. bias lead to improved contrast by the known a.c. stabilisation described in Proc 4th IDRC 1984, pp 217–220.

Figure 14:
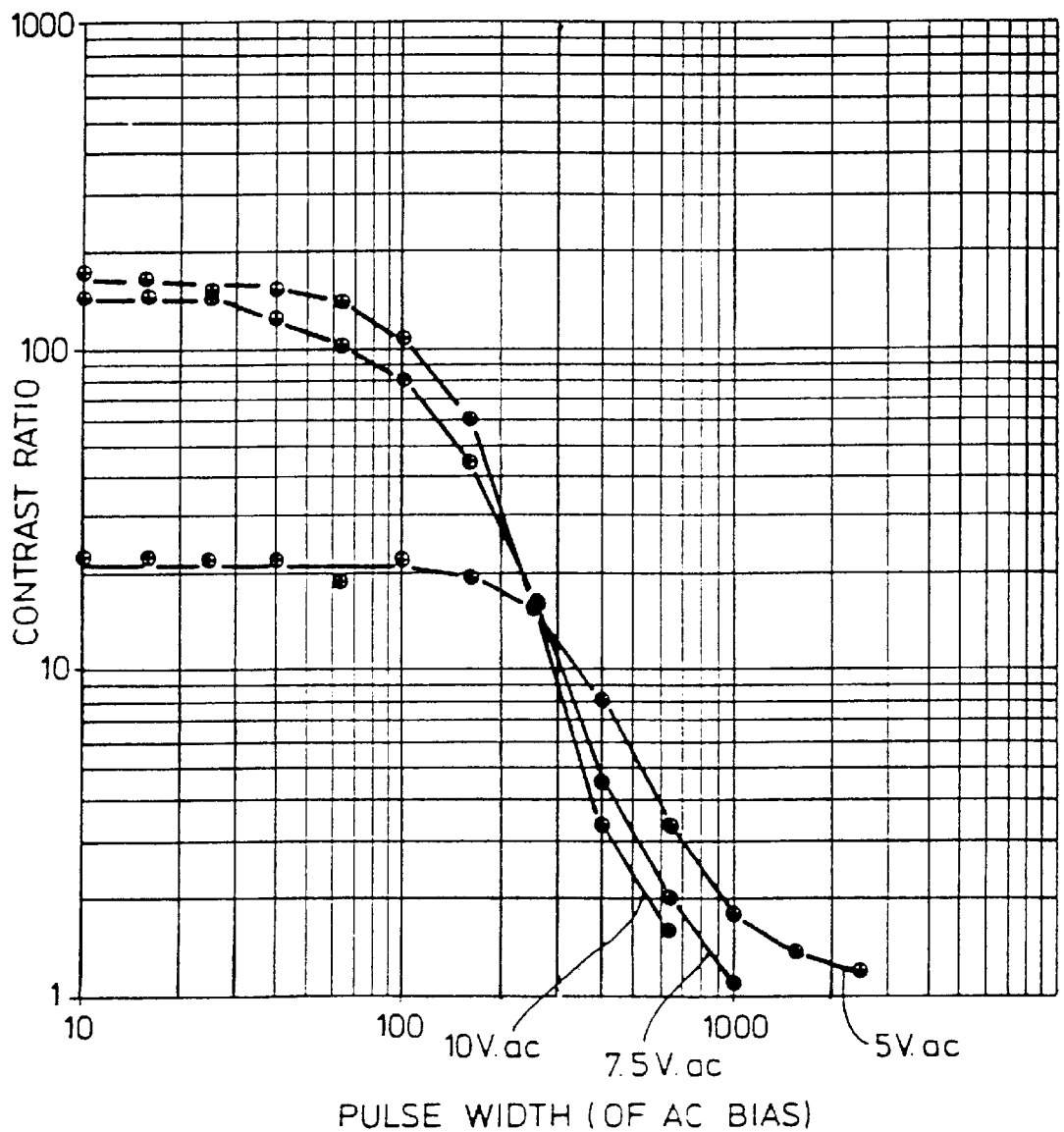
FIGS. 14, 15 show plots of contrast ratio against applied voltage pulse width for two different materials.
Figure 15:
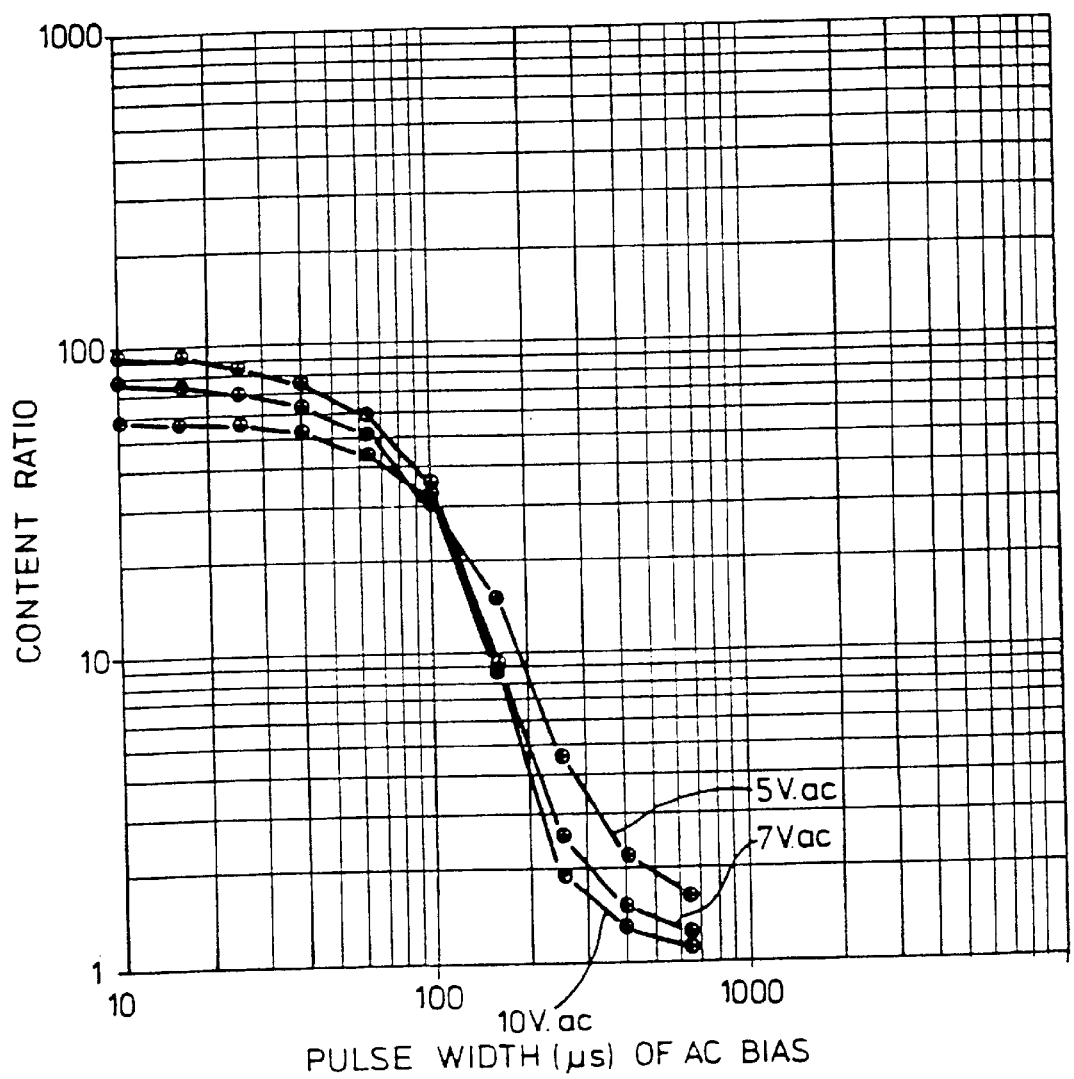

Further a.c. bias may be provided, e.g. from a 50 KHz source, direct onto those rows not receiving a strobe pulse. The effect on contrast ratio of a.c. bias, both magnitude and pulse width is shown in FIGS. 14 and 15 for the materials SCE8 and mixture A. These show inherent contrast ratio (CR) measured as a function of a.c. frequency as a cell is switched between its two bistable states and measured at various levels of a.c. bias.

Figure 6A:
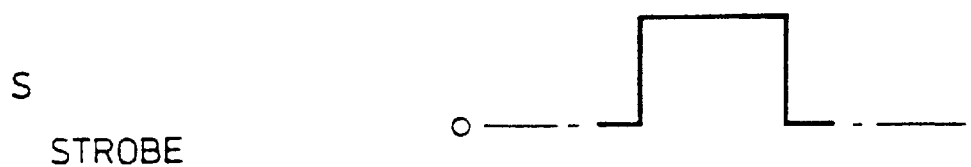
Figure 6B:
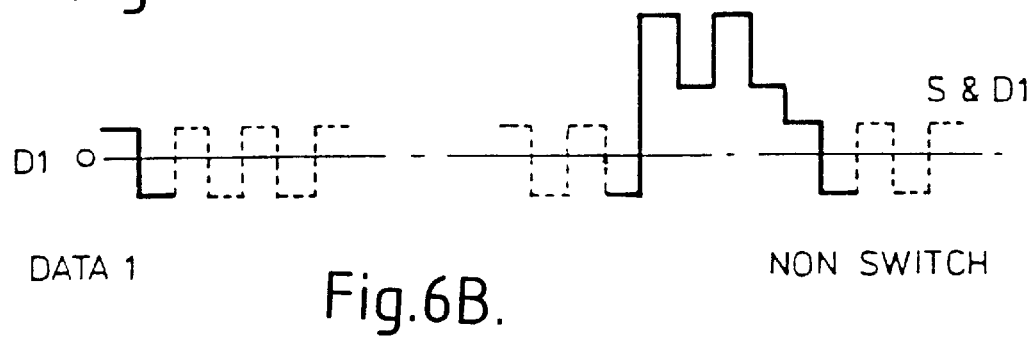
Figure 6C:
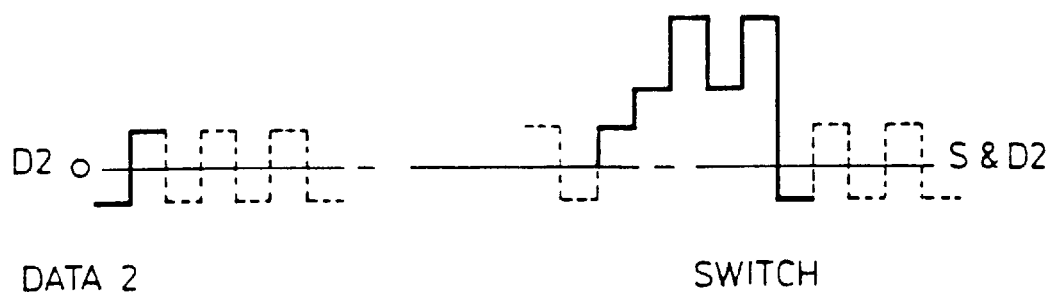
Figure 7A:
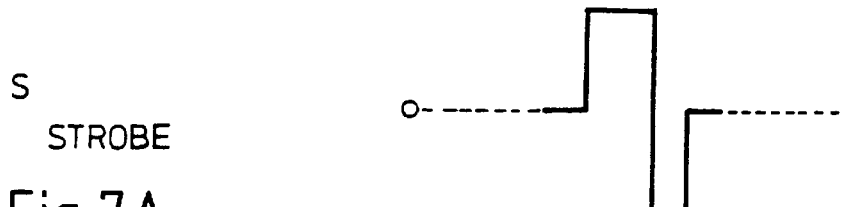
Figure 7B:
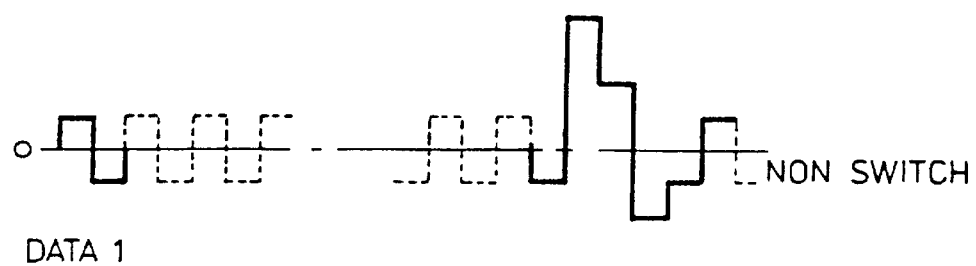
Figure 7C:
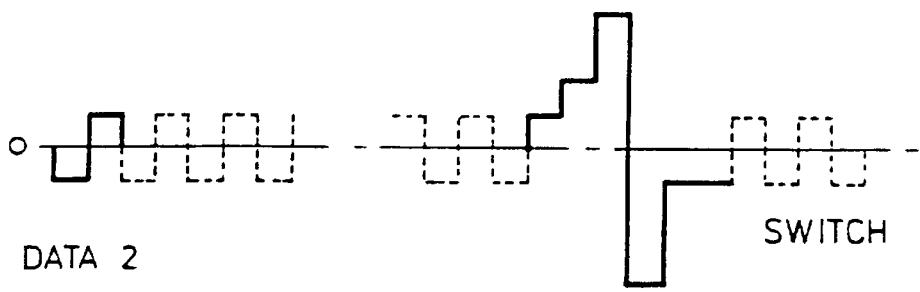
Figures 5, 12A:
Figures 6, 12A:
Figures 7, 12A:
Figures 8, 12A:

Alternative strobe waveforms are shown in FIGS. 5A, 5B, 5C, 6A, 6B, 6C, 7A, 7B, 7C, 8A, 8B. In FIGS. 5A, 5B, 5C the strobe is first a zero for 1×ts, and 3 for 3×ts, followed by its inverse. In FIGS. 6A, 6B, 6C the strobe waveforms is first a zero for 1×ts and 3 for 4×ts, followed by its inverse. In FIGS. 7A, 7B, 7C the strobe waveform is first a zero for 1×ts, a 3 for 2×ts, and −1 for 1×ts; this is followed by its inverse.

FIGS. 8A and 8B are a modification of FIGS. 4A, 4B, 4C and uses a non zero prepulse in the strobe waveform. As shown the first part of the strobe is between −1 and 1. not the zero value of FIGS. 4A, 4B, 4C. The remainder of the strobe is the same as in FIGS. 4A, 4B, 4C, i.e. amplitude 3 for twice ts. The resulting addressing waveform is then a first pulse of between −2 and −1 for both first and second fields. The effect of this prepulse is to change the position of the switching curves. FIG. 3 etc. Varying the value of the prepulse varies the shape and vertical position of the curves as explained wth reference to FIGS. 16, and 17 below. Table 8 below shows how the switching time varies with temperature. Such a variation can be reduced by varying the prepulse amplitude.

Figures 9, 12A:

FIGS. 9A, and 9B show a modification of FIGS. 4A, 4B, 4C. Is this modification the strobe waveform is zero for the first ts and 3 for the next 1.5ts. This 1.5ts is merely one example since any value greater than ts can be used up to about 5ts.

Figures 10, 12A:
Figures 1, 12B:
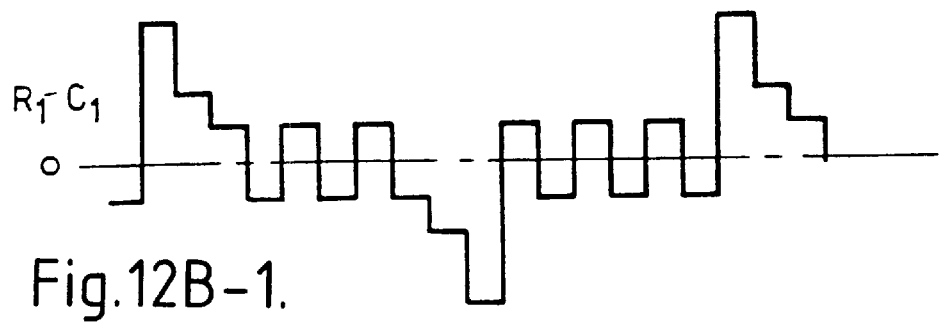
Figures 2, 12B:
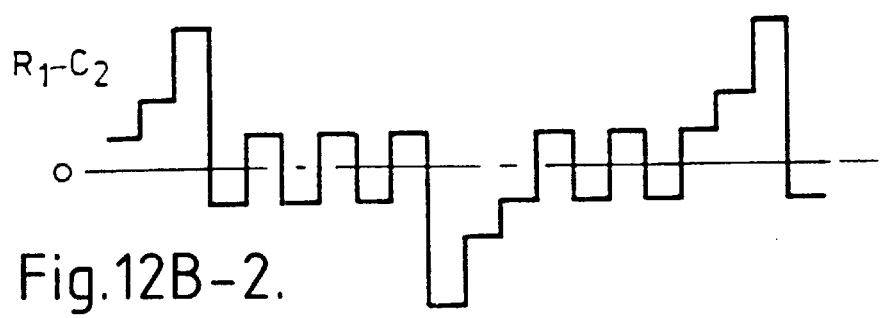
Figures 3, 12B:
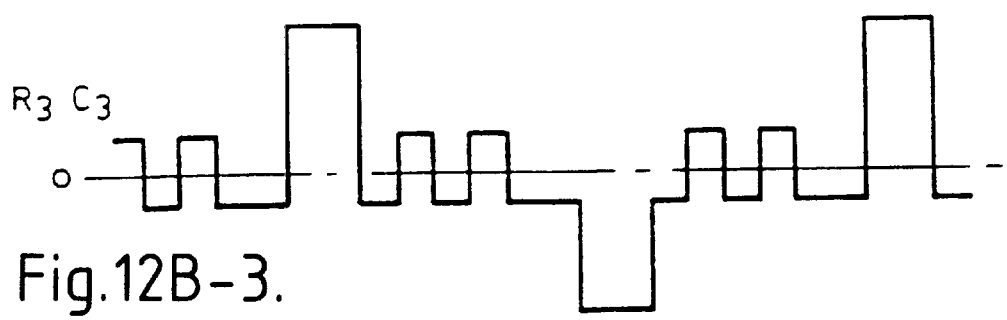
Figures 4, 12B:
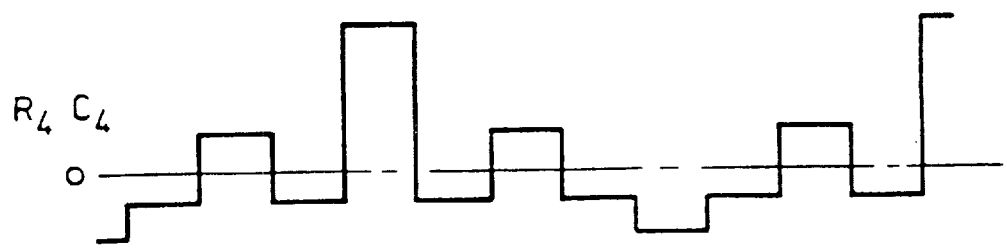

FIGS. 10A and 10B show a single blanking pulse of amplitude 4 applied for 4ts. This switches all the intersections to one switched state. A strobe is then used to switch selected intersections to the other switched state. Periodically the sign of the blanking and strobe are reversed to maintain overall net zero d.c. voltages. The use of a blanking pulse and single strobe can be applied to all the schemes of FIGS. 4A–8B. An advantage of blanking and strobe systems is that the whole display can be addressed in a single field time period.

Figure 11A:
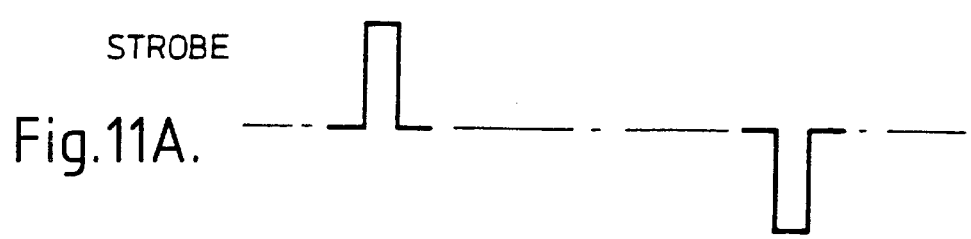
FIGS. 11A, 11B, and 11C show strobe, data, and addressing waveforms used in a prior art display.
Figure 11B:
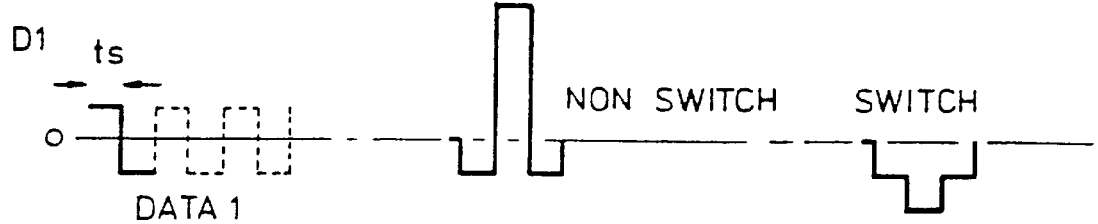
Figure 11C:
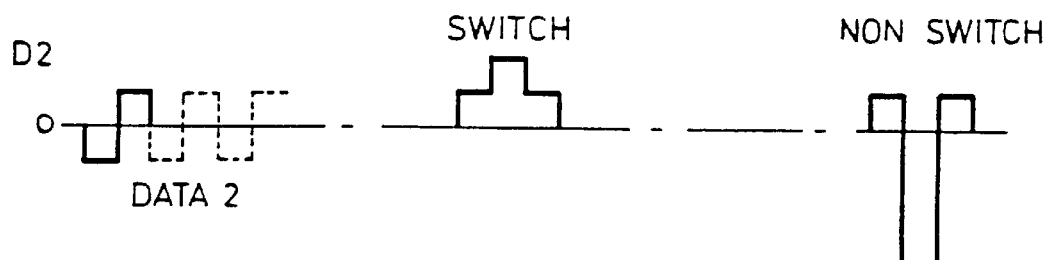

By way of comparison FIGS. 11A, 11B, 11C, show strobe, data, and addressing waveforms for a prior art display scheme, a mono pulse addressing scheme.

FIGS. 21A, 21B, 21C, 22A, 22B, 22C show addressing schemes of this invention using a blanking pulse and a single strobe pulse that provide a net zero d.c. value.

Figure 21A:
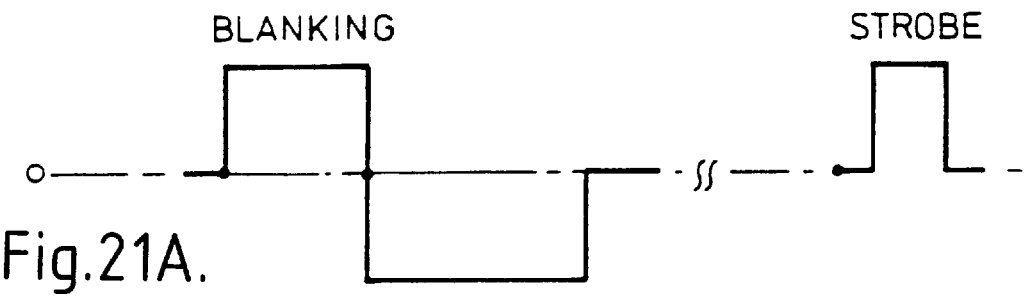
FIGS. 21A, 21B, 21C, 22A, 22B and 22C show different blanking, strobe and data waveforms.
Figure 21B:
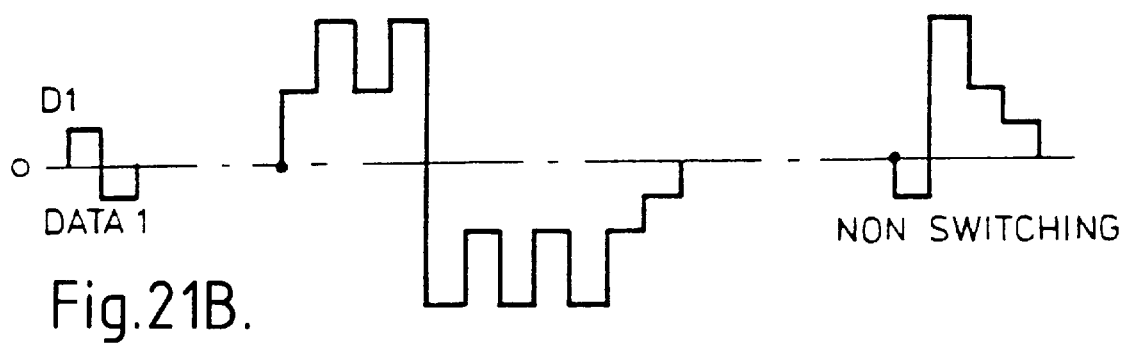
Figure 21C:
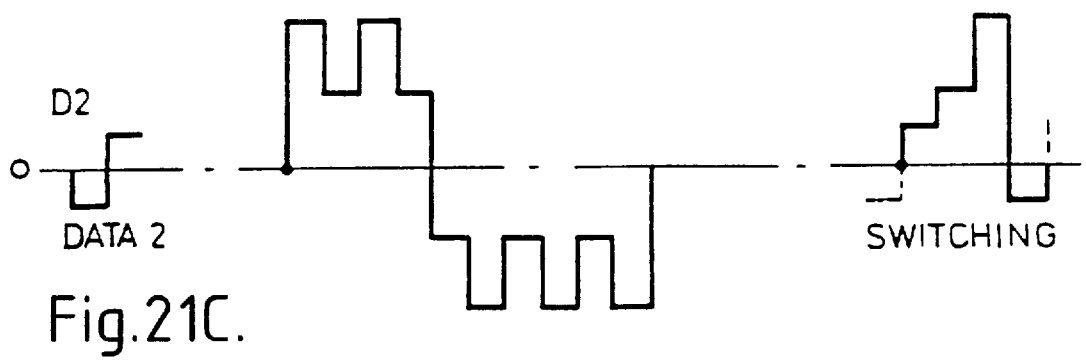

In FIGS. 21A, 21B, 21C the blanking pulse is in two parts, a prepulse of opposite sign to the main and blanking pulse. The function of the prepulse is to give zero d.c. balance. The prepulse has a value of 3 for 4ts immediately followed by −3 for 6ts. The strobe pulse is first a zero for 1ts immediately followed by 3 for 2ts; this strobe is the same as the strobe in FIGS. 4A, 4B, 4C. Data waveforms D1, D2 are also the same as in FIG. 4. The combination of blanking and D1 or D2 shows a large negative Vt product which switches all pixels in the addressed row to OFF. The strobe pulse in combination with D2 switches required pixels to ON as described above with reference to FIGS. 4A, 4B, 4C.

Figure 22A:
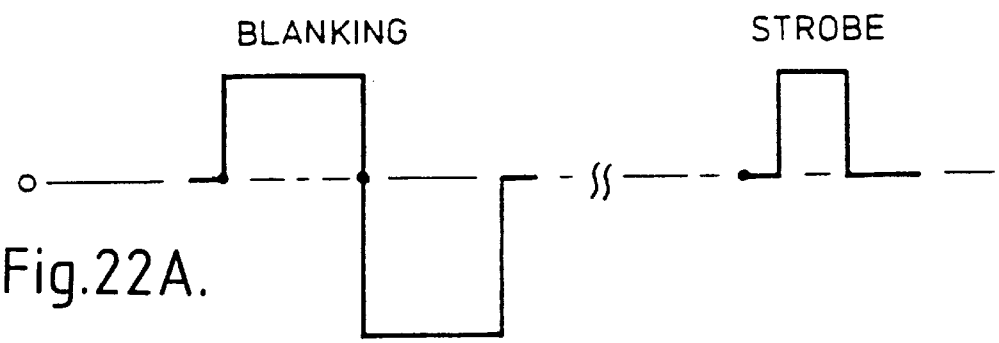
Figure 22B:
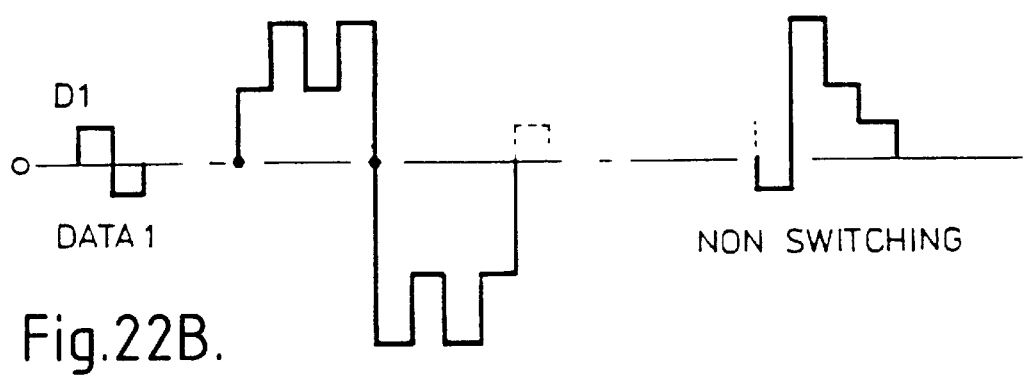
Figure 22C:
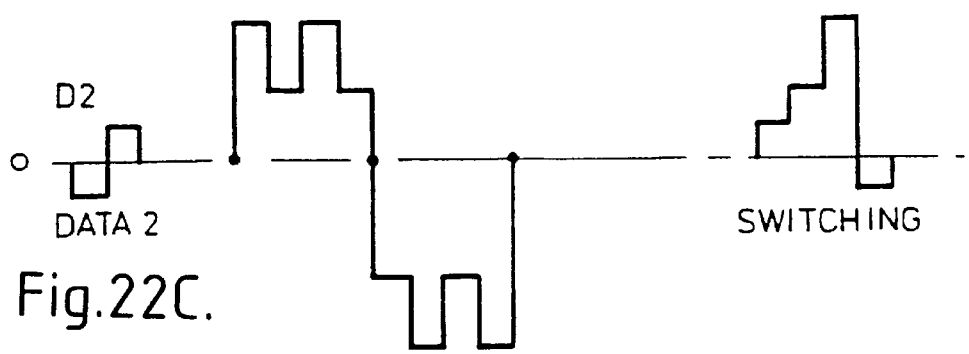
Figure 23A:
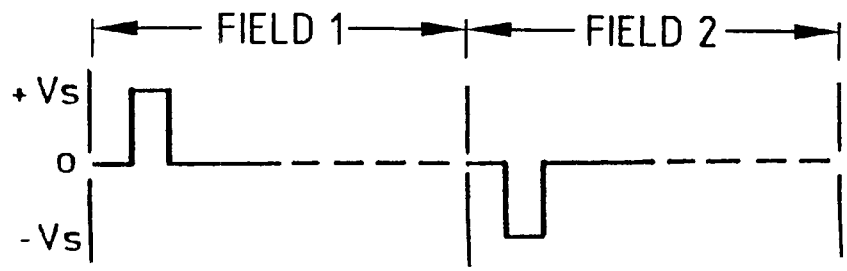
FIGS. 23A, 23B, 23C, 23D, 23E, 23F, 24A, 24B, 24C, 24D, 24E and 24F show row and column waveforms for an alternative to the prior art waveform of FIGS. 11A, 11B, 11C.
Figure 23B:
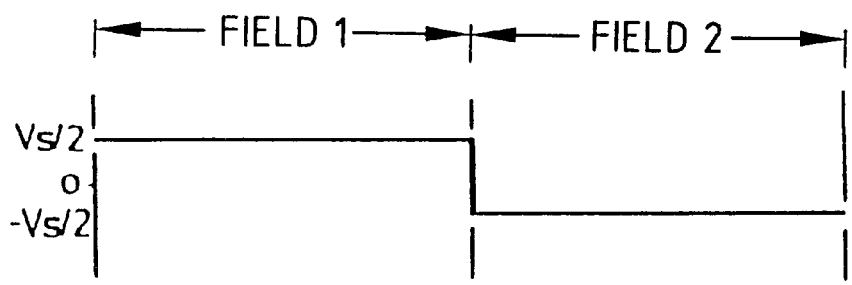
Figure 23C:
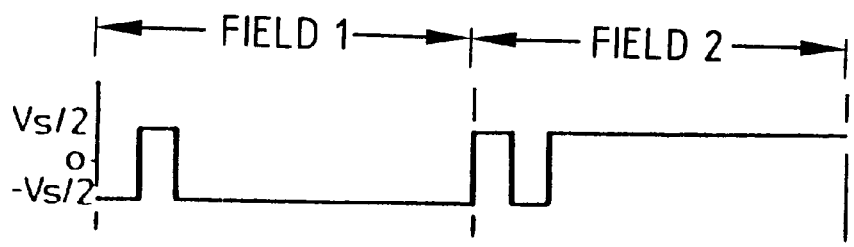
Figure 23D:
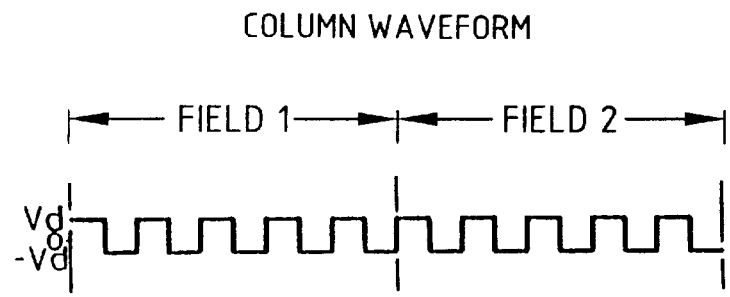
Figure 23E:
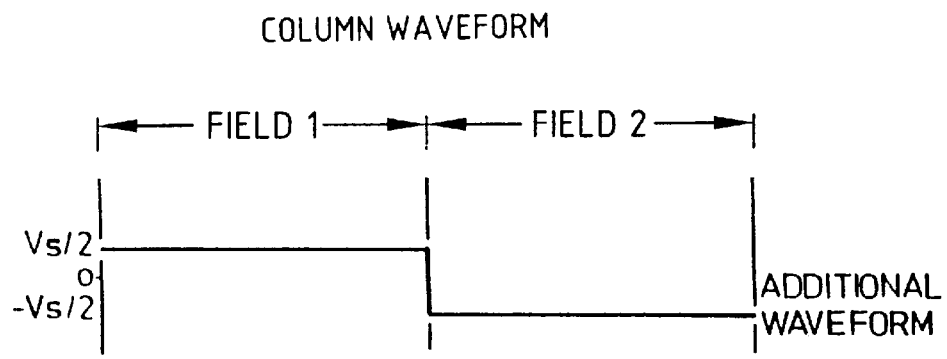
Figure 23F:
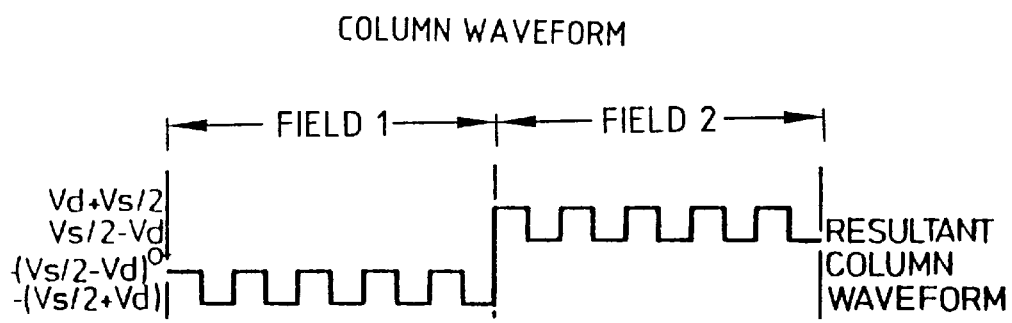
Figure 24A:
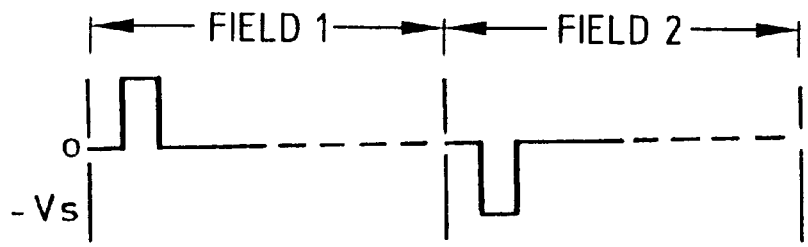
Figure 24B:
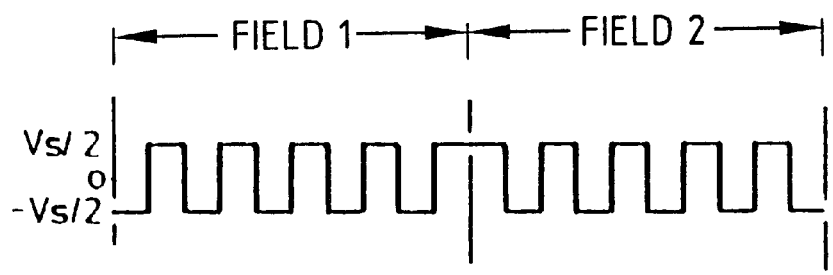
Figure 24C:
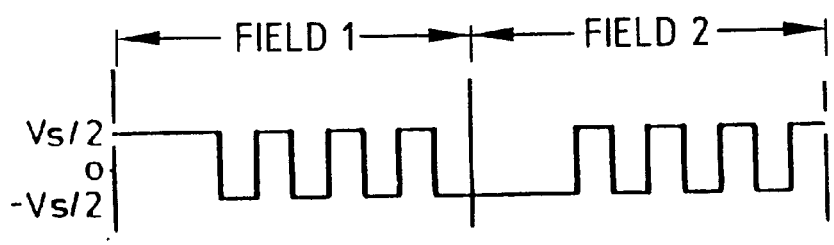
Figure 24D:
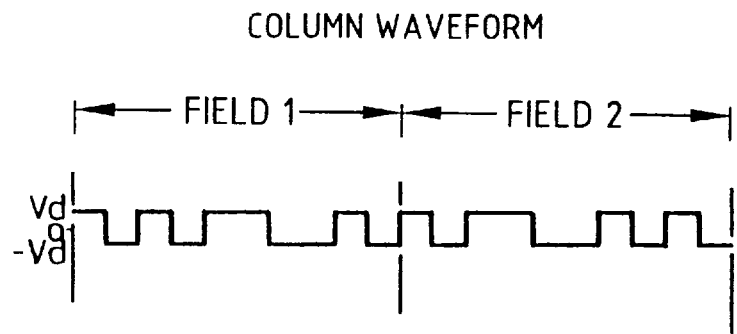
Figure 24E:
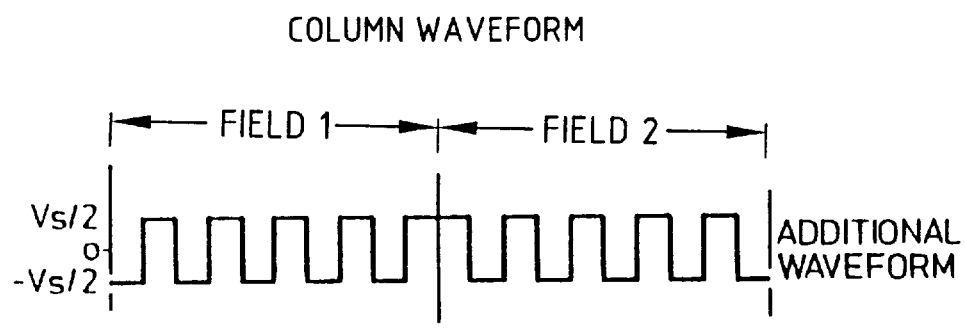
Figure 24F:
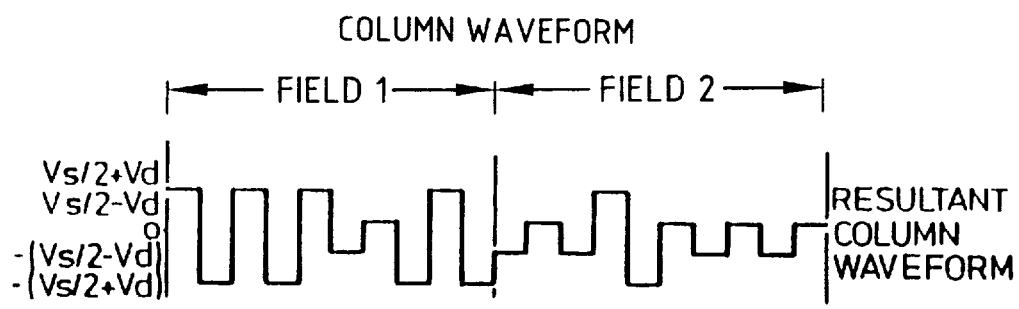
Figure 25A:
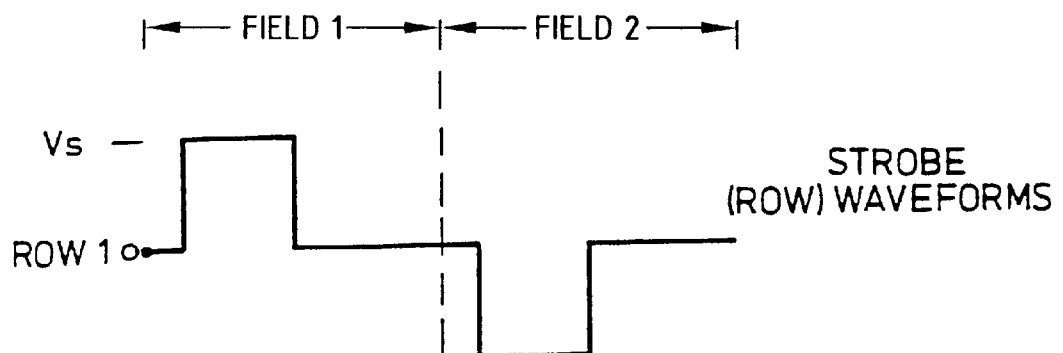
FIGS. 25A, 25B, 25C, 25D, 25E, 25F, 25G, 26A, 26B, 26C, 26D and 26E show row and column waveforms for a modification of FIGS. 6A, 6B, 6C.
Figure 25B:
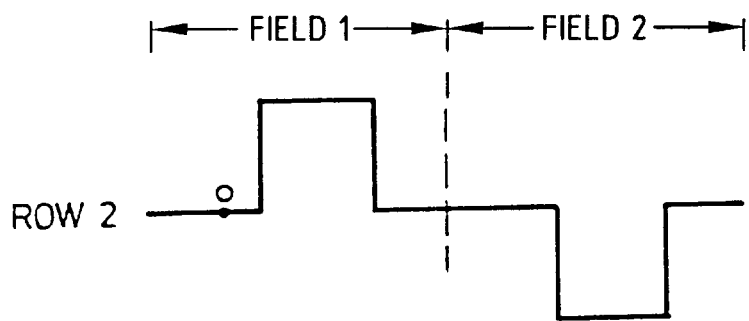
Figure 25C:
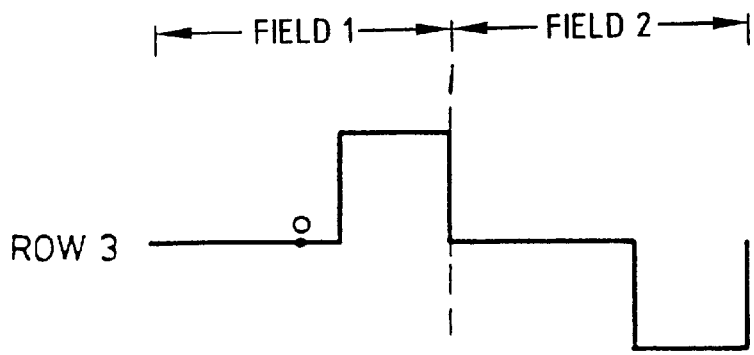
Figure 25D:
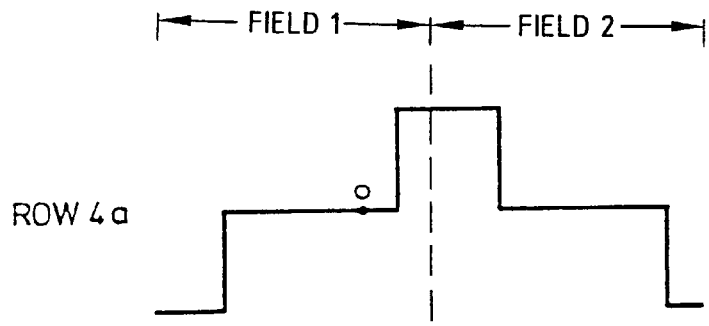
Figure 25E:
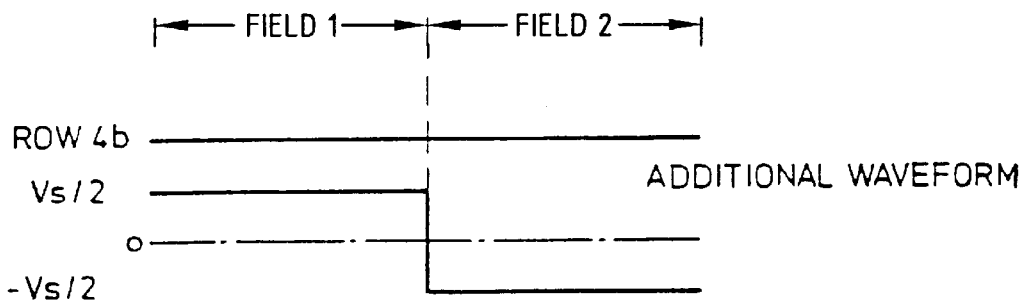
Figure 25F:
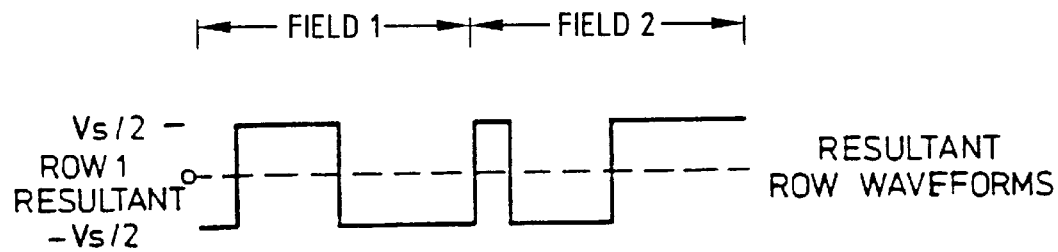
Figure 25G:
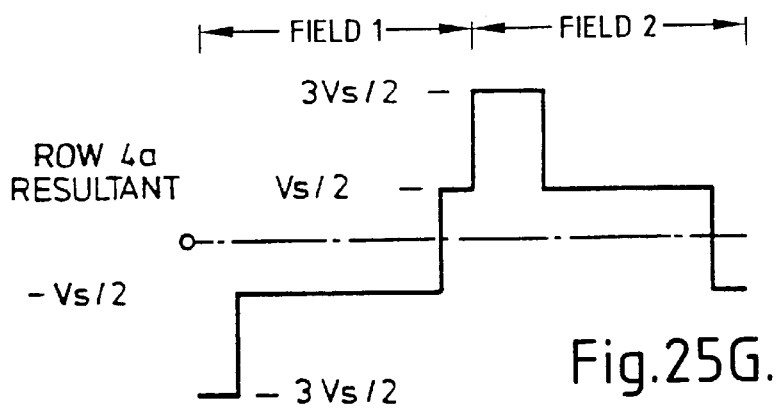
Figure 26A:
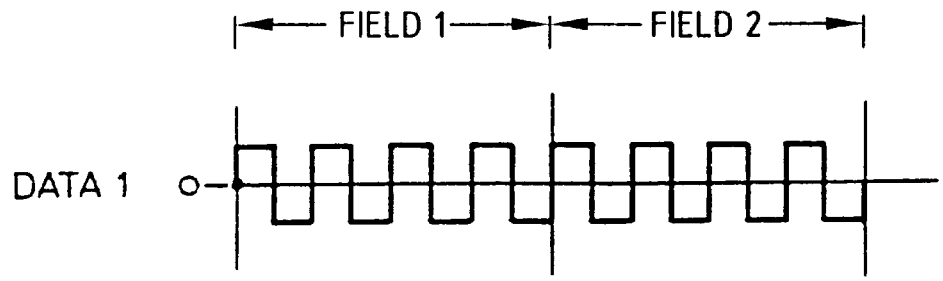
Figure 26B:
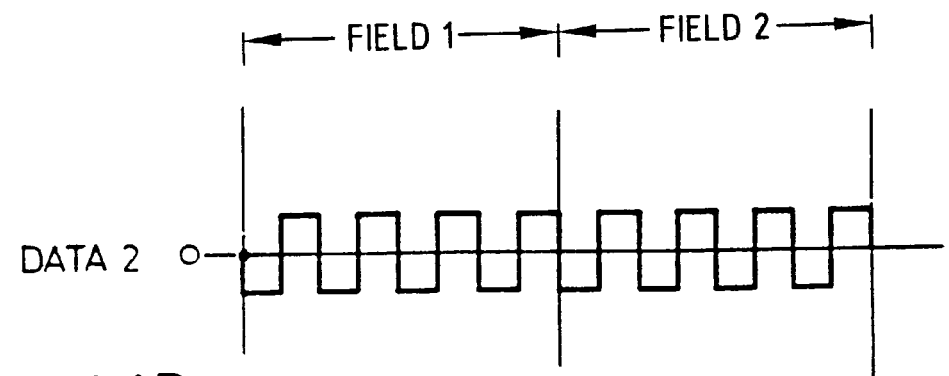
Figure 26C:
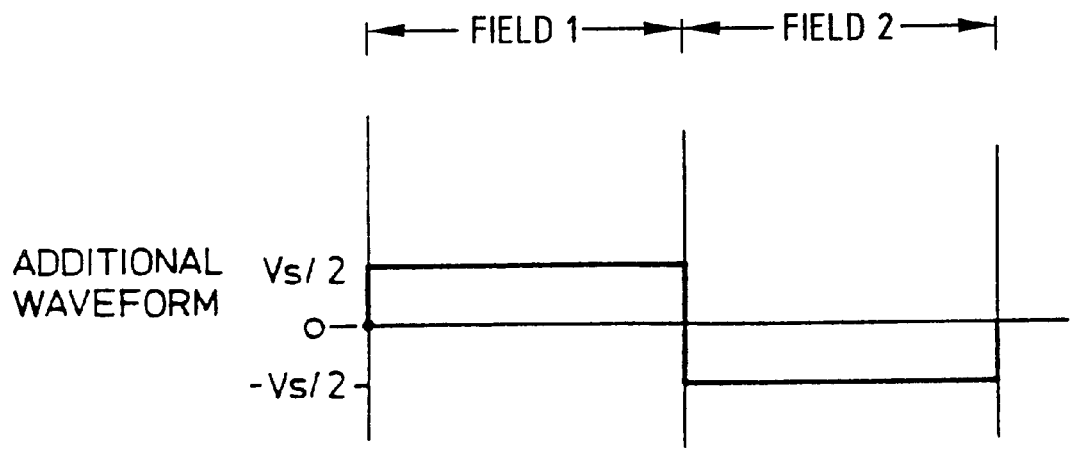
Figure 26D:
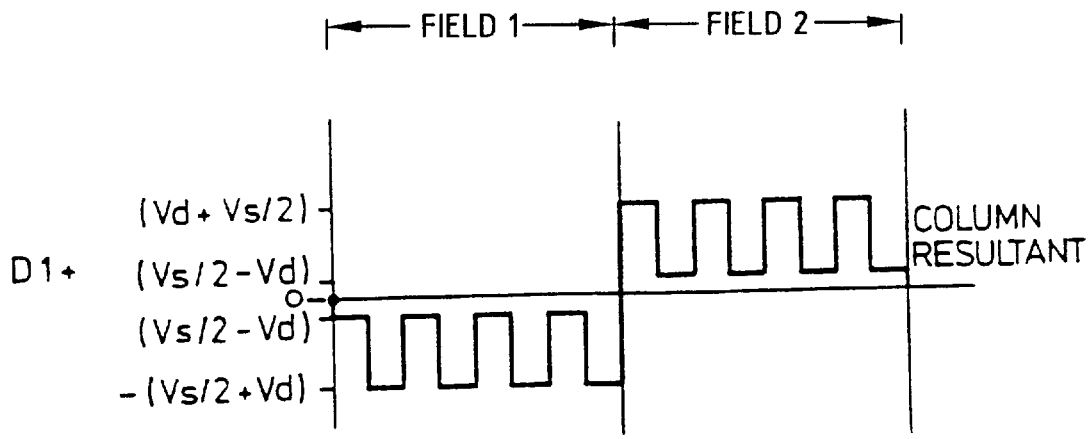
Figure 26E:
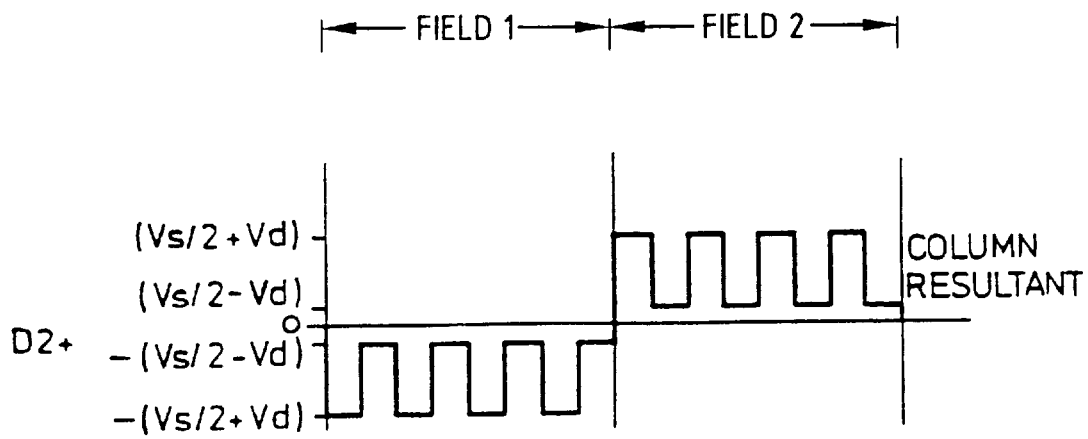

FIGS. 22A, 22B, 22C is similar to FIGS. 21A, 21B, 21C but has a different shape of blanking pulse. This blanking pulse has a prepulse of amplitude 3 for 4ts immediately followed by −4.5 for 4ts. The strobe pulse has amplitude 3 for 2ts as in FIGS. 4A, 4B, 4C. The combination of blanking pulse and D1 and D2 is shown to provide a large negative Vt product that switches all addressed rows to an OFF state. Again, selected pixels are switched to ON by the strobe and D2.

The blanking pulses of FIGS. 21A, 21B, 21C, 22A, 22B, 22C can be applied with the other forms of strobe pulses shown in FIGS. 5A–9B with amplitude and or Vt product arranged to give net zero d.c. For the example of FIGS. 8A, 8B where the first time slot of the strobe is varied eg with temperature. the amplitude of the pre and/or main blanking pulse is also adjusted to maintain a net zero d.c. value.

The blanking pulse may precede the strobe pulse by a variable amount but there is an optimum position for response time, contrast and visible flicker in the display. This is typically with blanking pulse starting six lines ahead of the strobe pulse but is dependent upon material parameters and the detail of the multiplex scheme.

Figure 13:
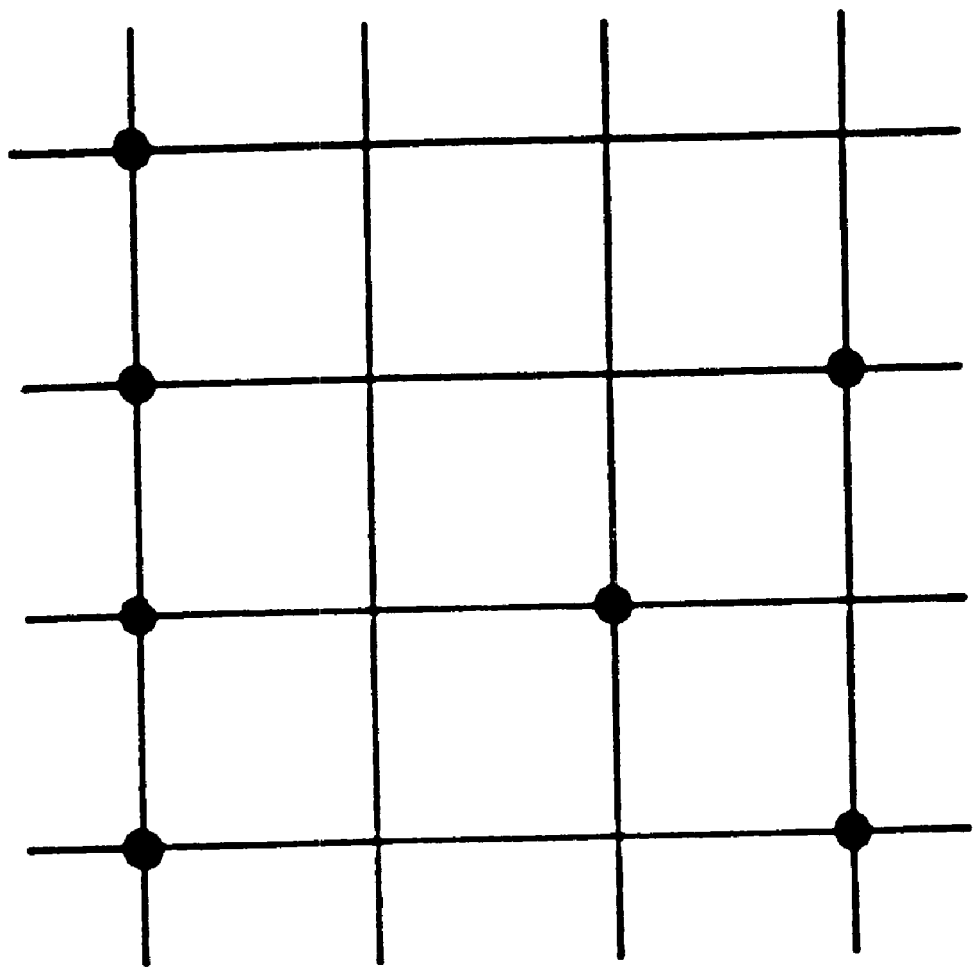
FIG. 13 is a 4×4 element array showing some intersections switched to an ON state with the remainder in an OFF state.

FIGS. 12A-1, 12A-2, 12A-3, 12A-4, 12A-5, 12A-6, 12A-7, 12A-8, 12A-9, 12A-10, 12B-1, 12B-2, 12B-3, 12B-4 show the waveforms involved in addressing a 4×4 matrix array showing information as shown in FIG. 13. Solid circles are arbitrarily shown as ON electrode intersections, i.e. display elements. unmarked intersections are OFF. The addressing scheme is that used in FIGS. 4A, 4B, 4C.

The positive or leading, strobe pulse is applied to each row 1 to 4 in turn: this comprises the first field. After the last row is addressed by the leading strobe pulse the negative, or trailing, strobe pulse is applied to each row 1 to 4 in turn and comprises the second field. Note there is an overlap between rows. For example the third ts period for row 1 occurs at the same as the first ts period of row 2. This overlap is more noticable for displays using the strobe waveforms shown in FIGS. 5A, 5B, 5C, 6A, 6B, 6C.

The data waveform data ON applied to column 1 remains constant because each intersection in column is always ON. Similarly for column 2 the data waveform is data OFF and remains constant because all intersections in column 2 are OFF. For column 3 the data waveform is data OFF whilst rows 1 and 2 are addressed, changing to data ON whilst row 3 is addressed, then changing back to data OFF whilst row 4 is addressed. This means that column 3 receives data OFF for 4×ts, data ON for 2×ts, data OFF for 2×ts, a period of one field time, the time taken for the positive strobe pulse to address every row. Similarly for column 4 the data waveform is data OFF for 2ts, data ON for 2ts, data OFF for 2ts, and data ON for 2ts. This is repeated for a further field period whilst the negative strobe pulse is applied. Two field periods are required to provide one frame period and completely address the display. The above is repeated until a new display pattern is needed.

Resulting addressing waveforms are shown in FIGS. 12B-1, 12B-2, 12B-3, 12B-4. For intersection row 1 column 1 (R1,C1) the material does not switch during the first field period because the material switching follows the upper curve of FIG. 3, and time and applied voltage level are made to lie below the switching curve. Instead the material switches during the second field period where the material switches because of the lower voltage/time requirements shown by the lower curve of FIG. 3. A similar reasoning applies to intersection R1,C2 where the material switches during the first field period.

For intersection R3,C3 the material switches during the second field period because the time/voltage applied during the first field period does not reach the higher value required by the upper curve of FIG. 3. Intersection R4,C4 switches at the end of the second field period whilst a negative strobe pulse is being applied.

The shape of waveforms appled to column 4 imposes difficulties. Due to the ON-OFF-ON-OFF pattern of display the data waveform has a period twice that of e.g. column 1. This can mean a lower contrast ratio as shown in FIGS. 14, 15 where longer pulse widths (low frequency) gives markedly lower contrast ratios. Additionally the amplitude of the non switching but large addressing pulse in the first field contrasts with a lower amplitude switching pulse in the second field. For this to switch reliably a large difference is needed between the two switching curves shown e.g. in FIG. 3.

The contrast ratio (CR) curves FIG. 14 (mixture A) and FIG. 15 (mixture SCE 8) indicate the inherent contrast of a device when switched between its two bistable positions in the presence of an ac bias. Clearly operation along the plateau of short pulse widths is desirable for both good contrast and uniform contrast. Since the multiplexing a. c. bias from the column waveform will carry variable frequency components dependent upon the pixel pattern, the contrast in the display can vary. This is most noticeable in the cases of all pixels in one state (highest frequency components) and alternate pixels of opposite states (lowest frequency components) where there is a factor of two difference in the column waveform frequency. Such two cases are illustrated by FIGS. 12A-1, 12A-2, 12A-3, 12A-4, 12A-5, 12A-6, 12A-7, 12A-8, 12A-9, 12A-10, 12B-1, 12B-2, 12B-3, 12B-4 and 13 for columns 1 and 4.

Figure 16:
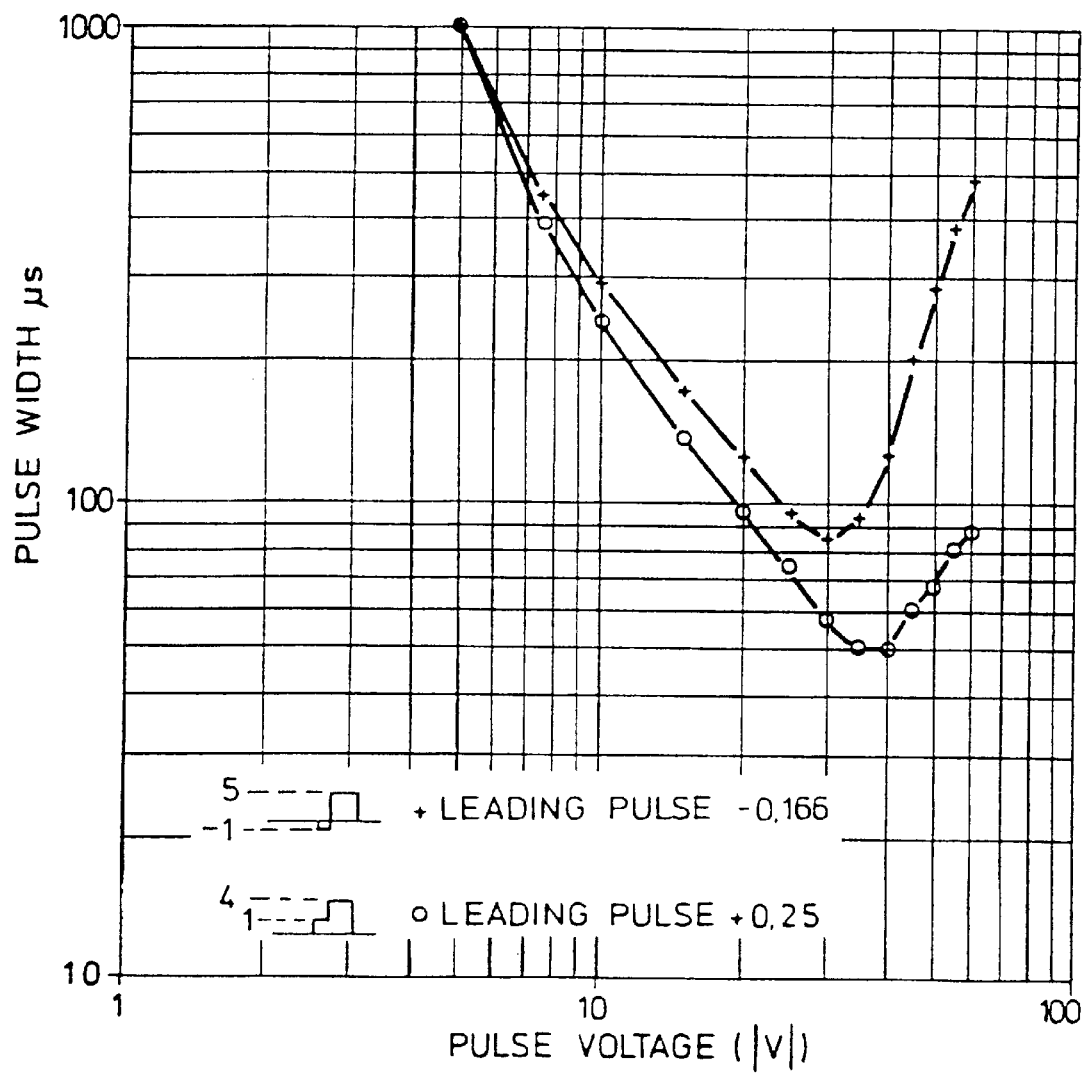
FIGS. 16–20 are log time against log applied voltage graphs showing the switching characteristics of one material with different applied waveforms.

FIG. 16 shows a log time/voltage graph showing switching characteristics for the material SCE8 in a parallel rubbed cell with a layer thickness of 1.8 $\mu$m at a temperature of 25° C. The axes of the graph are log ts and log pulse amplitude voltage.

The curves are obtained in a calibration cell simulating the addressing waveforms shown in FIGS. 4A, 4B, 4C. Two different addressing waveforms are used. The first one, waveform I, is a small negative pulse (of −1) applied for a time ts, followed by a larger positive pulse (of 5) applied for a time 2ts, ie the Lp/Tp ratio is −0.166. A period of zero volts is then followed by the inverse, i.e. a small positive pulse (of 1) and a negative larger pulse (of −5). Additionally a 50 KHz square wave signal is imposed on the addressing to give an a.c. bias and simulate a data waveform. The small pulse is 0.166 the value of the large pulse at all the voltage levels used to provide the curve. This first addressing waveform provides the upper curve. Values of time/voltage above this curve provide switching of the cell whilst values below the curve do not provide a switching.

The second addressing waveform, II, is first a positive small pulse of 1 applied for ts immediately followed by a larger positive pulse of 4 applied for 2ts. After a period of zero volts this is inverted. The small pulse is 0.25 the value of the larger pulse, ie Lp/Tp=0.25. Again a 50 KHz signal is imposed to provide an a.c. bias. This second addressing waveform provides the lower curve. Values of time/voltage above this curve provide switching of the cell; whilst values below the curve do not provide a switching. With a strobe voltage of Vs=50 volts, data voltage Vd=10 volts, the operating range is Vs−Vd=40 switching at 52 $\mu$secs. Vs+Vd=60 switching at about 480 $\mu$secs.

Figure 17:
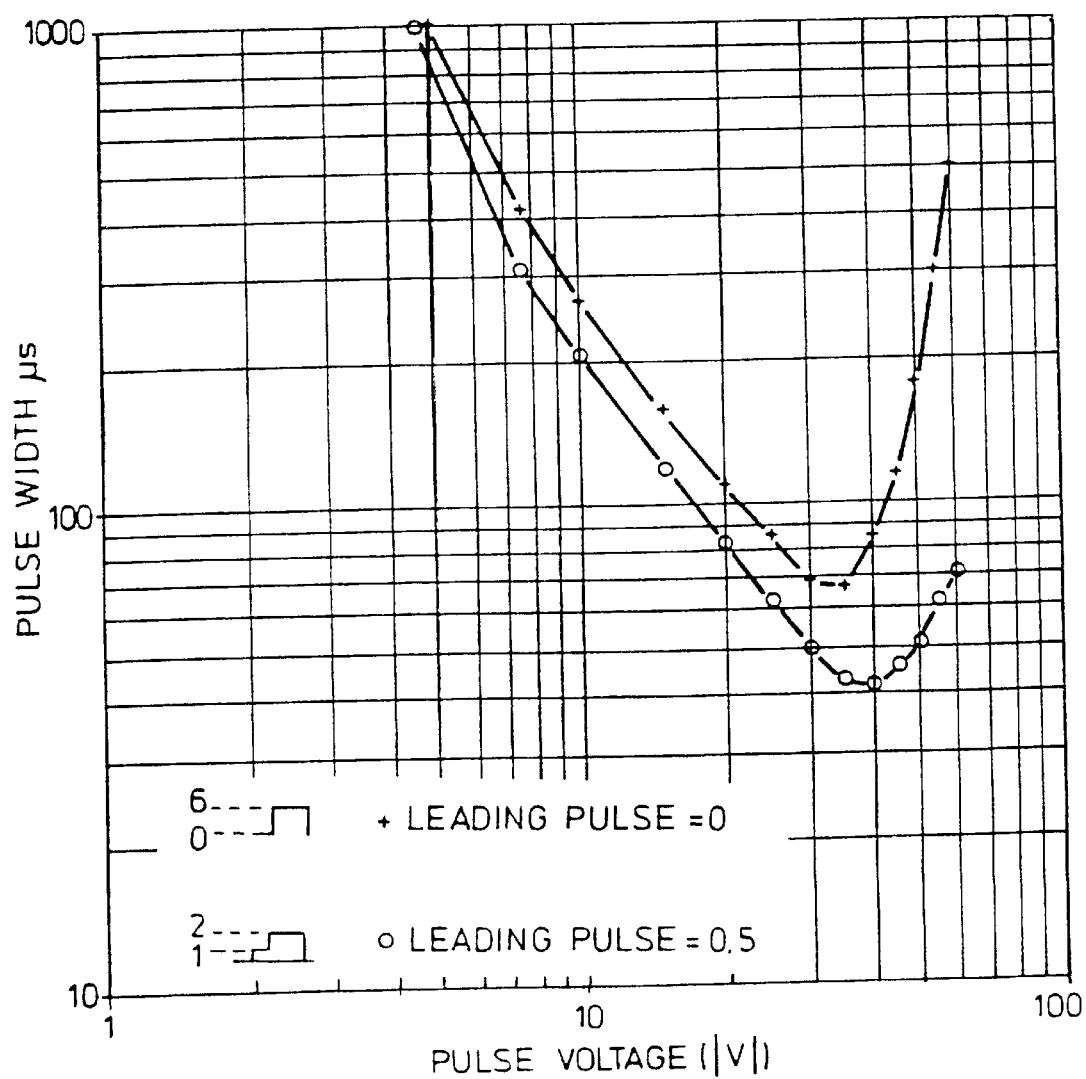

FIG. 17 shows time voltage characteristics for the same addressing scheme used in FIG. 16 namely that of FIGS. 4A, 4B, 4C, but modified by use of a small pre pulse in the strobe waveform as in FIGS. 8A, 8B. FIG. 17 shows that the effect of the pre pulse is to move the vertical position of the curves. This useful for temperature compensation where movement of the curves due to temperature changes is counteracted by changing the value of the pre pulse.

For the upper curve the simulation addressing waveform is first a zero voltage for ts followed by a larger positive pulse of 6 for 2ts, ie Lp/Tp=0. After a number of time intervals ts at zero volts the inverse is applied to maintain a net zero dc voltage. A 50 KHz waveform is superimposed to provide a.c. bias.

For the lower curve the addressing waveform is first a small positive pulse of 1 for ts followed by a larger positive pulse of 2 for 2 ts, ie Lp/Tp=0/5. This is later reversed in polarity. A 50 KHz waveform is superimposed to provide a.c. bias.

The operating range for Vs=50. Vd=10 is: lower curves. Vs−Vd=40 switching at 42 $\mu$secs, and the upper curve, Vs+Vd=60 switching at about 500 $\mu$secs.

Figure 18:
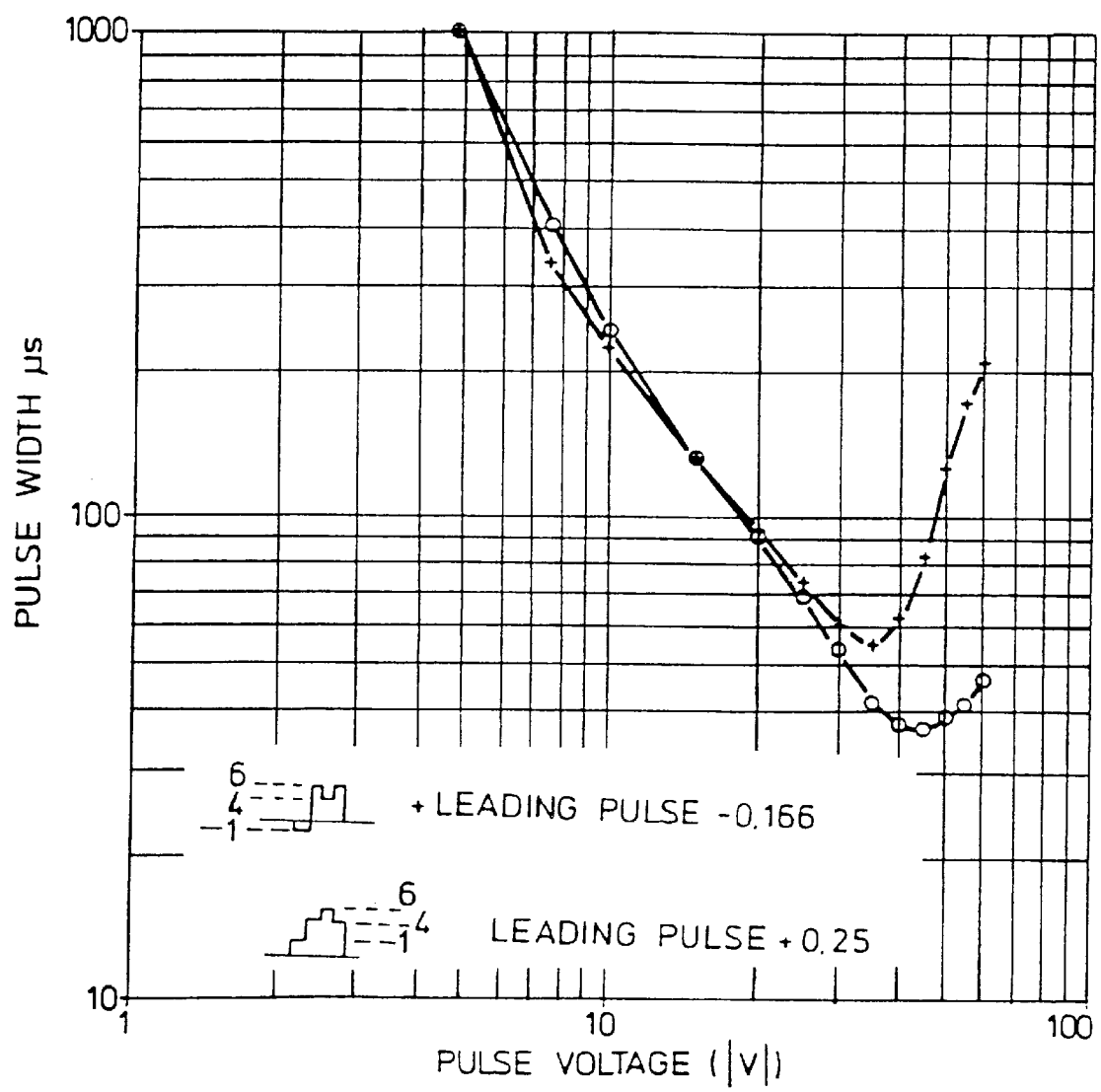

FIG. 18 is similar to FIG. 16 with an identical cell but using simulations of the addressing waveforms of FIGS. 5A, 5B, 5C. Thus the addressing waveforms are −1, 6, 4, 6, (Lp/Tp=−0.166) for the upper curve, and 1, 4, 6, 4 (Lp/Tp= 0.25) for the lower curve. For Vs=50, Vd=10. the lower curve switches at 38 $\mu$s, and the upper curve switches at about 210 $\mu$s.

Figure 19:
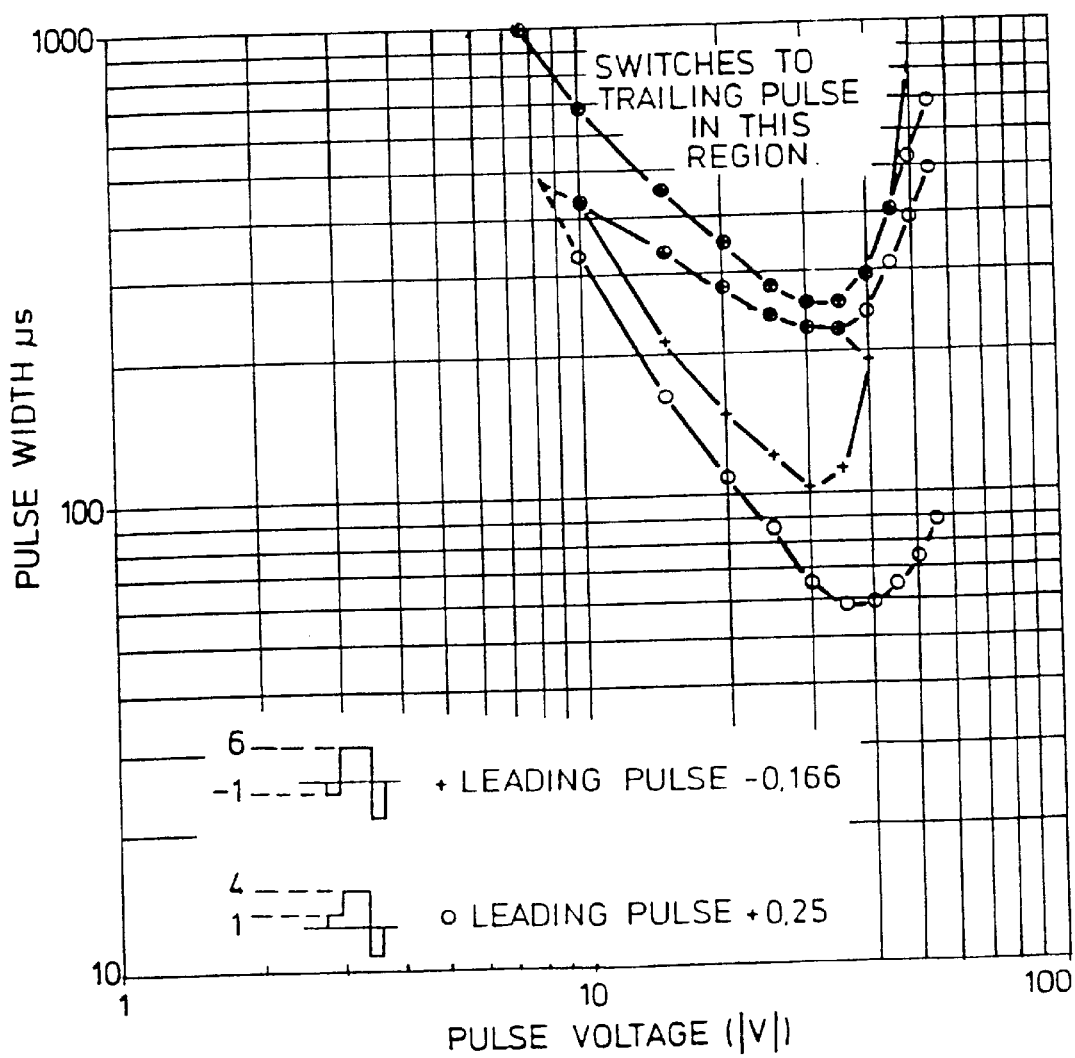

FIG. 19 is similar to FIG. 16 with an identical cell but using simulations of the addressing waveforms of FIGS. 7A, 7B, 7C. The addressing waveforms are as shown, namely for the curve with points marked "+" the values −1, 6, 6, −6 (Lp/Tp=−0.166) and for the curve with points marked "o" 1, 4, 4, −4. The switching is complicated since the upper curve has a re-entrant area where the material switches on the trailing pulse instead of the main pulse. For Vs=50, Vd=10, the lower curve. Vs−Vd=40 switches at 58 to 240 and again at greater than 300 $\mu$s when switching is to the trailing pulse. The upper curve, Vs+Vd=60 does not show any switching at 60 volts. Thus multiplex operation on the main pulse occurs between 58 and 240 $\mu$s and on the trailing pulse at greater than 300 $\mu$s.

Figure 20:
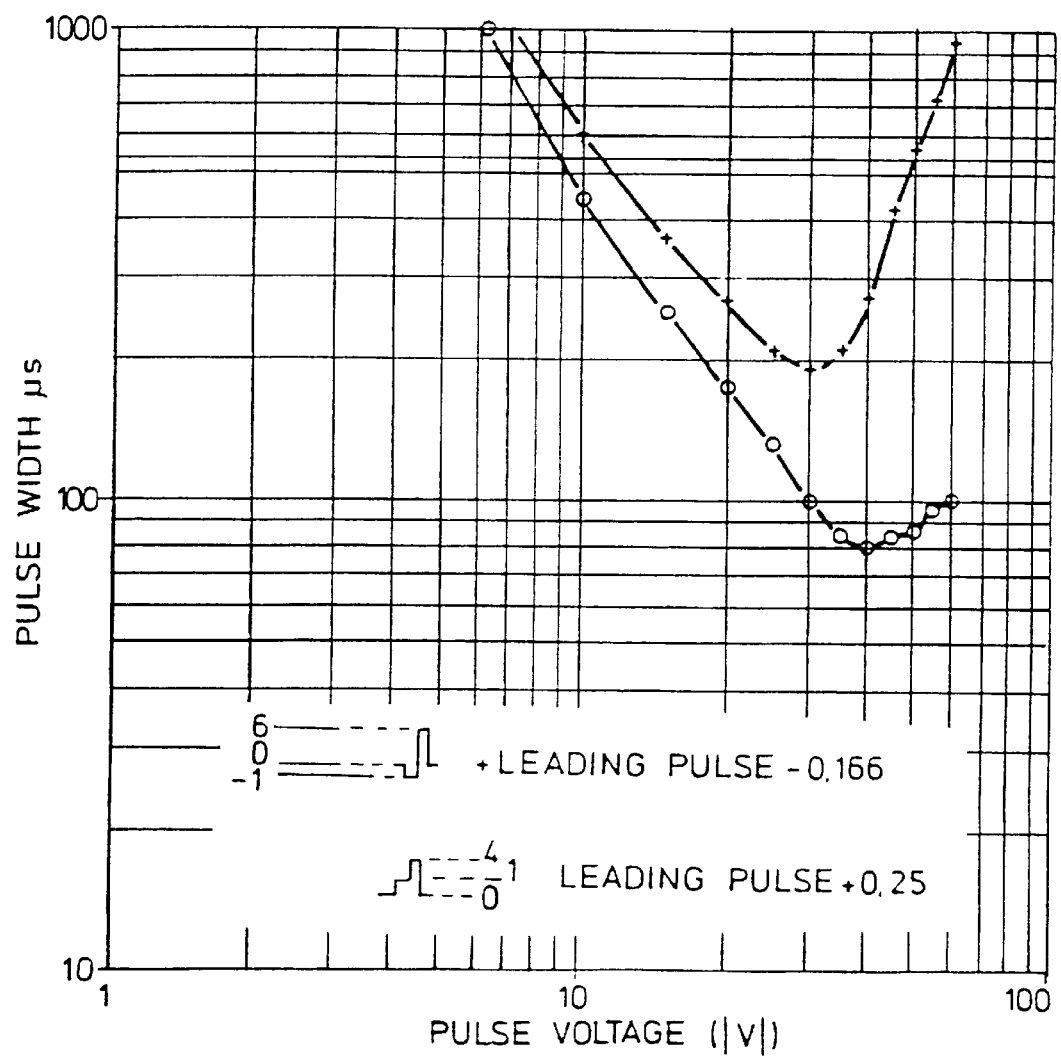

By way of comparison the log time/voltage characteristics are given in FIG. 20 for a conventional mono pulse addressing scheme using a simulation of the strobe and data waveforms of FIGS. 11A, 11B, 11C in the same cell as for FIGS. 11A, 11B, 11C. For the upper curve the simulation addressing waveform is a negative pulse of amplitude 1 unit for ts followed by a positive 6 units for ts. For the lower curve the addressing waveform is a positive pulse of 1 unit for ts followed by a positive pulse of 4 units for ts. The pulse amplitudes are described as units to indicate relative values; the curves are obtained at the illustrated voltages. For Vs=50. Vd=10. the lower curve, Vs−Vd=40 switches at 80 $\mu$s. and the upper curve, Vs+Vd 60 switches at about 950 $\mu$s.

Details follow of device characteristics for different liquid crystal materials and different addressing waveforms. A single pixel test cell was constructed and addressed with a simulation of a 50 row display. Different values of strobe, Vs, and data, Vd, voltage amplitude were selected to give addressing voltage values such that switching voltages lay above the lower curve of FIG. 3 and non switching voltages lay below the upper curve of FIG. 3, and the value of ts, in $\mu$seconds, adjusted to give a clear switching display. This ensured the cell was operating in the area indicated by hatched lines of FIG. 3. The value of contrast ratio, CR, is the ratio of light transmitted in one switched state relative to that transmitted in the other switched state; it is a measure of the clarity of the display. CR is measured at the extremes of the pulse width ts, or at specified values of ts. CR has been optimised by adjusting one of the switched positions of the director in the liquid crystal to correspond to a minimum transmission.

In the following tables the operating range of time ts does not quite match the information given by the volts/time plots of FIGS. 16–20. The reason for this is threefold. Firstly the simulations used in FIGS. 16–20 are not completely accurate for all situations of display patterns. Secondly at longer pulse widths and correspondingly long frame times an operator can discern flicker due to transient switching; this can be interpreted as not-multiplexing. Thirdly at longer pulse widths the contrast ratio becomes low, see FIGS. 14, 15. For example a CR of 2 at 200 $\mu$s and so it is difficult to determine whether a material is switching or not.

Thus for practical displays the upper time limit should be taken as when a display no longer usefully switches. This may be much less than the actual switching time.

Material SCE8 in a 1.8 $\mu$m thick layer at 25° C.

TABLE 1 addressing scheme of FIGS. 4A,4B,4C

| Vs | Vd | ts | CR |
|---|---|---|---|
| 50 | 5 | 36–53 | 8–7 |
| 50 | 7.5 | 46–115 | 45–15 |
| 40 | 10 | 46–88 | 77–21.5 |
| 50 | 10 | 57–140 | 71–9.5 |

TABLE 2 addressing scheme of FIGS. 5A,5B,5C

| | | | |
|---|---|---|---|
| 50 | 7.5 | 40–73 | 26–11 |
| 40 | 10 | 34–57 | 64–23 |
| 50 | 10 | 47–100 | 67–17 |

TABLE 3 addressing scheme of FIGS. 7A,7B,7C

| 50 | 5 | 44–280 | 17.5–5.4 |
|----|----|--------|----------|
| 50 | 7.5 | 62–225 | 62–5 |
| 40 | 10 | 56–186 | 87–5.8 |
| 50 | 10 | 69–213 | 70–4.8 |

TABLE 4 addressing scheme of FIGS. 11A,11B,11C (mono pulse)

| 50 | 5 | 65–450 | 23–3 |
|----|----|--------|------|
| 50 | 7.5 | 75–480 | 65–2.2 |
| 40 | 10 | 95–345 | 49–2.7 |
| 50 | 10 | 83–370 | 63–2.3 |

Mixture B in a layer 1.7 $\mu$m thick at 30° C.

TABLE 5 addressing scheme of FIGS. 4A,4B,4C

| Vs | Vd | ts | CR (at lowest ts) |
|----|----|----|-------------------|
| 50 | 10 | 22–78 | 51 |
| 50 | 7.5 | 17–82 | 33 |
| 40 | 10 | 16–47 | 56 |

TABLE 6 addressing scheme of FIGS. 5A,5B,5C

| 50 | 10 | 20–68 | 51 |
|----|----|-------|----|
| 50 | 7.5 | 14–62 | 24 |
| 40 | 10 | 13–36 | 53 |
| 40 | 7.5 | 10–37 | 7.2 |
| 45 | 7.5 | 10–42 | 10 |

TABLE 7 addressing scheme of FIGS. 7A,7B,7C

| 50 | 10 | 24–80 | 52 |
|----|----|-------|----|
| 50 | 7.5 | 19–98 | 35 |
| 40 | 10 | 18–66 | 68 |

TABLE 8 addressing scheme of FIGS. 4A,4B,4C, at different temperatures

| 50 | 10 | 39–123 | 48 | 25° C. |
|----|----|--------|----|--------|
| 50 | 10 | 21–73 | 59 | 30° C. |
| 50 | 10 | 12–43 | 58 | 35° C. |
| 50 | 10 | 7–25 | 26 | 40° C. |
| 50 | 10 | 5–10 | 5 | 45° C. |

TABLE 9 addressing scheme of FIGS. 5A,5B,5C, at different temperatures

| 50 | 10 | 18–64 | 52 | 30° C. |
|----|----|-------|----|--------|
| 50 | 10 | 8–20 | 13 | 40° C. |
| 50 | 10 | 8–37 | 44 | 35° C. |
| 50 | 10 | 35–120 | 48 | 25° C. |

TABLE 10 addressing scheme of FIGS. 11A,11B,11C, at 30° C. (mono pulse)

| 50 | 10 | 28–93 | 47 |
|----|----|-------|----|
| 50 | 7.5 | 24–148 | 33 |
| 40 | 10 | 32–120 | 44 |

Material A in a layer 1.7 $\mu$m thick at 30° C.

TABLE 11 addressing scheme of FIGS. 4A,4B,4C

| 40 | 10 | 39–100 | 46 |
|----|----|--------|----|
| 50 | 10 | 59–120 | 26 |

TABLE 12 addressing scheme of FIGS. 5A,5B,5C

| 40 | 10 | 33–85 | 48 |
|----|----|-------|----|
| 50 | 10 | 52–110 | 30 |

TABLE 13 addressing scheme of FIGS. 7A,7B,7C

| 40 | 10 | 40–150 | 46 |
|----|----|--------|----|
| 50 | 10 | 64–220 | 23 |

TABLE 14 addressing scheme of FIGS. 11A,11B,11C (Mono Pulse)

| 40 | 10 | 56–150 | 32 |
|----|----|--------|----|
| 50 | 10 | 66–300 | 22 |

Material Merck catalogue number 917
Temperature 30° C.; Vs=60V; Vd=15V

TABLE 15

| Addressing scheme | FIGS. 11A,11B,11C | FIGS. 4A,4B,4C | FIGS. 5A,5B,5C | FIGS. 7A,7B,7C |
|---|---|---|---|---|
| fastest slot time $\mu$s | 27 | 15 | 12 | 17 |
| longest slot time $\mu$s | 116 | 37 | 28 | 70 |
| operating range (time) | 4.3× | 2.5× | 2.3× | 4.1× |
| contrast ratio (CR) | 41 | 84 | 80 | 76 |
| Brightness (%) | 63 | 63 | 60 | 63 |

Operating Range is: longest slot time/fastest slot time

Brightness (%) is compared with no cell between parallel polarisers.

Material RSRE A206: temperature 30° C., Vs=30V, Vd=10V.

TABLE 16

| Addressing scheme | FIGS. 11A,11B,11C | FIGS. 4A,4B,4C | FIGS. 5A,5B,5C |
|---|---|---|---|
| fastest slot time $\mu$s | 60 | 27 | 20 |
| operating range (time) | >2× | 2.6× | 2.2× 1× |

TABLE 16-continued

| Addressing scheme | FIGS. 11A,11B,11C | FIGS. 4A,4B,4C | FIGS. 5A,5B,5C |
|---|---|---|---|
| contrast ratio (CR) | 14 | 48 | 55 |
| Brightness (%) | 77 | 67 | 60 |

Material RSRE A206 is: AS500:A151 1:1+5% dopant
AS 500:A151 1:1 +5% dopant
AS 500 is:

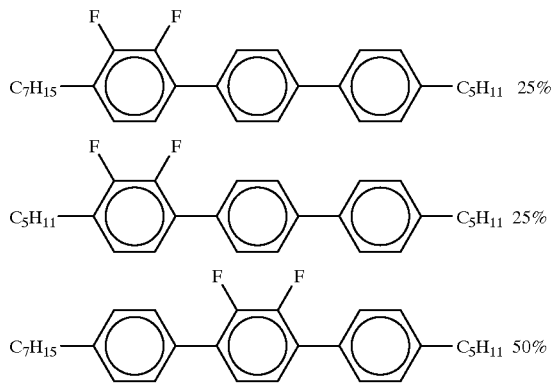

A151 is:

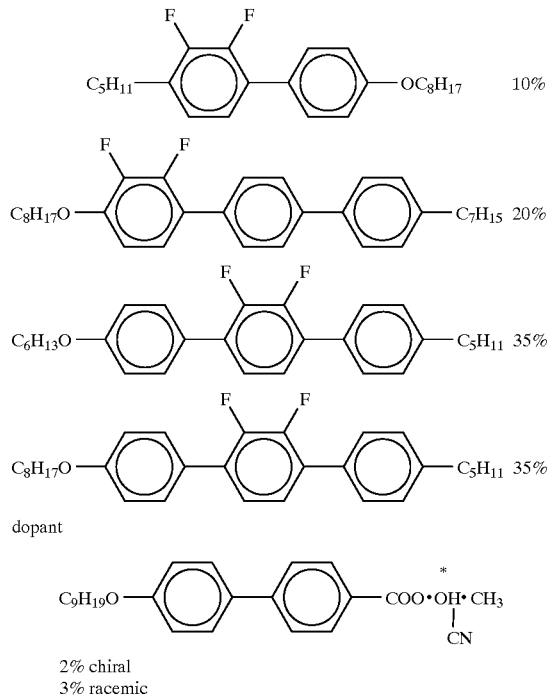

2% chiral
3% racemic

The * denotes chirality, without it the material is racemic.

In Nematic liquid crystal devices it is known to reduce peak row and column voltages by applying additional waveforms to both row and column electrodes.

For examples FIGS. 23A–24F show two different schemes for reducing the peak voltage of prior art monopulse drive systems of FIGS. 11A, 11B, 11C.

In FIGS. 23A, 23B, 23C, 23D, 23E, 23F a strobe (row) waveform is alternately a zero for 1.ts and a positive pulse of Vs for 1.ts in the first field followed by a zero for 1.ts and a negative pulse of –Vs for 1 ts in the second field. The additional waveform is a positive Vs/2 during the first field followed by a –Vs/2 in the second field. The resultant strobe waveform varies between Vs/2 and –Vs/2 as shown. The data (column) waveforms are alternate Vd and –Vd pulses each lasting for 1.ts. The additional waveform applied to each column is Vs/2 for the first field followed by –Vs/2 for a second field time. The resultant data waveform is as shown to vary between Vd+Vs/2 and –(Vs/2+Vd). The effect of the additional waveform is to reduce the peak voltage of e.g. 50 volts to 35 volts.

An alternative to FIGS. 23A, 23B, 23C, 23D, 23E, 23F are shown in FIGS. 24A, 24B, 24C, 24D, 24E, 24F. As before normal strobe pulses are a zero for 1.ts and a positive Vs for 1.ts in the first field time and a zero for 1.ts then –Vs for 1.ts in the second field time. The additional waveform is a rectangular waveform of period 2.ts applied for the first field time followed by its inverse for the second field time, each varying between Vs/2 and –Vs/2 volts. The resultant strobe (row) waveforms are as shown. Similarly the data (column) waveforms are rectangular varying between +Vd and –Vd. The additional waveform is the same as applied to the row electrodes. The data (column) resultant waveform is as shown and varies between Vs/2+Vd and –(Vs/2+Vd). Again this reduces the peak voltage needed by display drivers from e.g. 50 volts to 35 volts.

The same principles of FIGS. 23A–24F may be applied to the addressing scheme of FIGS. 4A–14 8B above. This is shown in FIGS. 2A–25G which is a modification of the scheme of FIGS. 5A, 5B, 5C. Strobe pulses of a zero for 1.ts are followed by Vs for 3.ts in the first field time. Strobe pulses of zero for 1.ts and then –Vs for 3.ts follow in the second field time. The strobe waveform is shown for rows 1, 2, 3 and 4 of a 4 row display; two different strobes are shown for row 4 for reasons explained later. The additional waveform applied to row (and also column) electrodes is shown as Vs/2 for the first field time then –Vs/2 for the second field time. The resultant row waveform for row 1 is shown to be –Vs/2 for 1.ts, Vs/2 for 3.ts. –Vs/2 for 4.ts. Vs/2 for 1.ts, –Vs/2 for 3.ts, and Vs/2 for 4.ts in the first and second field times. The resultant of strobe and additional waveform and the row indicated as row 4a is shown to have a large peak value of +and – 3Vs/2. The reason for this is the extended strobe pulse length which overlaps into the adjacent field. To overcome this row 4 is either kept hidden from view or addressed with a zero strobe voltage as indicated at row 4b. In a more practical example of e.g. a 128 row display, the waveform generated would be programmed as for a 128 row display but only 127 rows used in the scheme of FIGS. 25A, 25B, 24C, 24D, 24E, 24F . Should even longer strobe pulse be used e.g. as in FIGS. 6A, 6B, 6C line even more lines will be left unused. Waveform applied to column electrodes are shown in FIGS. 26A, 26B, 26C, 26D, 26E. Date 1 and its enverse data 2 are as in FIGS. 5A, 5B, 5C. The additional waveform is Vs/2 for one field time, and –Vs/2 for the second field time. The resultant column waveform is shown to vary between +/– (Vd+Vs/2). Thus for the scheme of FIGS. 5A, 5B, 5C with Vs=50 volts and Vd=10 volts the scheme of FIGS. 25A–26E reduces peak voltage to 35 volts.

We claim:

1. A method of multiplex addressing a ferro electric liquid crystal matrix display comprising a layer of liquid crystal material contained between two cell walls carrying electrodes formed as a first set of electrodes on one cell wall and a second set of electrodes on the other cell wall, the electrodes comprising a matrix of addressable intersections, at least one of the cell walls being surface treated to provide surface alignment to liquid crystal molecules along a single direction, said method comprising the steps of:

generating for each electrode in the first set of electrodes a waveform comprising a pulse of one polarity and a pulse of opposite polarity, at least one of said pulses comprising a strobe waveform, said strobe waveform comprising a first time period having a duration of ts immediately followed by a time period greater than ts when the voltage level is a greater amplitude than the voltage level during the first time period, generating two data waveforms of alternating positive and negative value pulses with one data waveform pulse the inverse of the other data waveform pulse, each data waveform pulse having a duration ts;

applying said strobe waveform separately to each electrode in the first set of electrodes in synchronism with said data waveforms with a time delay of 2ts between the start of strobe waveforms being applied to any two electrodes in the first set of electrodes;

applying one of said two data waveforms for a time period of 2ts to each electrode in the second set of electrodes synchronized with the strobe waveform applied to each electrode in the first set of electrodes, whereby each intersection is addressed with a pulse of appropriate sign and magnitude to turn that intersection to a desired display state once per complete display address period with an overall net zero d.c. value, wherein two strobe pulses of opposite polarity are used in addressing each intersection wherein an additional waveform is applied to both sets of electrodes to produce a reduction in the peak voltage applied to the electrodes.

2. A method of multiplex addressing a ferroelectric liquid crystal matrix display comprising a layer of liquid crystal material contained between two cell walls carrying electrodes formed as a first set of electrodes on one cell wall and a second set of electrodes on the other cell wall, the electrodes comprising a matrix of addressable intersections, at least one of the cell walls being surface treated to provide surface alignment to liquid crystal molecules along a single direction, said method comprising the steps of:

generating for each electrode in the first set of electrodes a first waveform comprising a pulse of one polarity and a pulse of opposite polarity, at least one of said pulses comprising a non-blanking strobe waveform wherein a blanking waveform is one in which all pixels along an electrode in the first set of electrodes are switched to a first display state irrespective of a data waveform applied to the electrodes in the second set of electrodes, said strobe waveform comprising a first pulse having a duration of ts and a voltage level, said first pulse immediately followed by a second pulse having a duration greater than ts and a voltage level of greater amplitude than the voltage level of the first pulse;

generating two data waveforms of alternating positive and negative value pulses with one data waveform pulse the inverse of the other data waveform pulse, each data waveform pulse having a duration ts;

applying said strobe waveform separately to each electrode in the first set of electrodes in synchronism with said data waveforms with a time delay of 2ts between the start of strobe waveforms being applied to any two electrodes in the first set of electrodes;

applying one of said two data waveforms for a time period of 2ts to each electrode in the second set of electrodes synchronized with the start of the strobe waveform applied to each electrode in the first set of electrodes, whereby each intersection is addressed with the resultant of said strobe waveform and appropriate data waveform to turn selected intersections to a desired display state once per complete display address period.

3. The method according to claim 2, including the step of applying said first waveform separately to each electrode in the first set of electrodes, with a time delay of at least 12 ts between the start of said pulse of one polarity and the start of said pulse of opposite polarity being applied to any one electrode in the first set of electrodes.

4. The method of claim 2 wherein the strobe waveform has a further pulse immediately following said time period greater than ts and wherein said further pulse is of opposite polarity to that during said time period greater than ts.

5. The method of claim 2 wherein the strobe waveform has a substantially zero voltage in the first time period ts.

6. The method of claim 2 wherein the strobe waveform has a non-zero voltage in the first time period ts, such voltage being less than the following voltages and being variable in amplitude to provide compensation in material switching characteristics with temperature changes.

7. The method of claim 2 wherein said time period greater than ts is a period selected from 1.5ts, 2.0ts, 2.5ts, 3.0ts.

8. A method of multiplex addressing a ferroelectric liquid crystal matrix display comprising a layer of liquid crystal material contained between two cell walls carrying electrodes formed as a first set of electrodes on one cell wall and a second set of electrodes on the other cell wall, the electrodes comprising a matrix of addressable intersections, at least one of the cell walls being surface treated to provide surface alignment to liquid crystal molecules along a single direction, said method comprising the steps of:

generating for each electrode in the first set of electrodes two non-blanking strobe waveforms of opposite polarity, wherein a blanking waveform is one in which all pixels along an electrode in the first set of electrodes are switched to a first display state irrespective of a data waveform applied to the electrodes in the second set of electrodes, each strobe waveform comprising a first pulse in a first time period having a duration of ts and a voltage level, said first pulse immediately followed by a second pulse in a second time period having a duration greater than ts and a voltage level of a greater amplitude than the voltage level during the first time period, generating two data waveforms of alternating positive and negative value pulses with one data waveform pulse the inverse of the other data waveform pulse, each data waveform pulse having a duration ts;

applying one of said two non-blanking strobe waveforms separately to each electrode in the first set of electrodes in synchronism with said data waveforms with a time delay of 2ts between the start of strobe waveforms being applied to any two electrodes in the first set of electrodes until all electrodes in the first set of electrodes have received said one of said strobe waveforms, t hen applying the other of said two non-blanking strobe waveforms separately to each electrode in the first set of electrodes in synchronism with said data waveforms with a time delay of 2ts between the start of strobe waveforms being applied to any two electrodes in the first set of electrodes, applying one of said two data waveforms for a time period of 2ts to each electrode in the second set of electrodes synchronized with the start of the strobe waveform applied to each electrode in the first set of electrodes, whereby each intersection is addressed with the resultant of said strobe waveform and appropriate data waveform to turn selected intersections to a desired display state once per complete display address period.

9. The method of claim 8 wherein the strobe waveform has a further pulse immediately following said time period greater than ts and wherein said further pulse is of opposite polarity to that during said time period greater than ts.

10. The method of claim 8 wherein the strobe waveform has a substantially zero voltage in the first time period ts.

11. The method of claim 8 wherein the strobe waveform has a non-zero voltage in the first time period ts, such voltage being less than the following voltages and being variable in amplitude to provide compensation in material switching characteristics with temperature changes.

12. The method of claim 8 wherein said time period greater than ts is a period selected from 1.5ts, 2.0ts, 2.5ts, 3.0ts.

13. A method of multiplex addressing a ferroelectric liquid crystal matrix display comprising a layer of liquid crystal material contained between two cell walls carrying electrodes formed as a first set of electrodes on one cell wall and a second set of electrodes on the other cell wall, the electrodes comprising a matrix of addressable intersections, at least one of the cell walls being surface treated to provide surface alignment to liquid crystal molecules along a single direction, said method comprising the steps of:

generating two data waveforms of alternating positive and negative value pulses with one data waveform pulse the inverse of the other data waveform pulse, each data waveform pulse having a duration ts, generating for each electrode in the first set of electrodes a blanking waveform of duration greater than Its and an amplitude such that all pixels along an electrode in the first set of electrodes are switched to a first display state irrespective of which of said two data waveforms are applied to the electrodes in the second set of electrodes, generating for each electrode in the first set of electrodes a non-blanking strobe waveform comprising a first pulse in a first time period having a duration of its and a voltage level, said first pulse immediately followed by a second pulse in a second time period having a duration greater than Its and a voltage level of a greater amplitude than the voltage level during the first time period, applying said blanking waveform separately to each electrode in the first set of electrodes with a time delay of 2ts between the start of blanking waveforms being applied to any two electrodes in the first set of electrodes, applying said strobe waveform separately to each electrode in the first set of electrodes in synchronism with said data waveforms with a time delay of 2ts between the start of strobe waveforms being applied to any two electrodes in the first set of electrodes, and applying one of said two data waveforms for a time period of 2ts to each electrode in the second set of electrodes synchronized with the start of the strobe waveform applied to each electrode in the first set of electrodes, whereby each intersection is addressed with the resultant of said strobe waveform and appropriate data waveform to turn selected intersections to a desired display state once per complete display address period.

14. The method according to claim 13 further including a time delay of at least 12ts between the beginning the application of said blanking waveform to an electrode in the first set of electrodes and the beginning of the application of said strobe waveform to said electrode in the first set of electrodes.

15. The method of claim 13 wherein the strobe waveform has a further pulse immediately following said time period greater than ts and wherein said further pulse is of opposite polarity to that during said time period greater than ts.

16. The method of claim 13 wherein the strobe waveform has a substantially zero voltage in the first time period ts.

17. The method of claim 13 wherein the strobe waveform has a non-zero voltage in the first time period ts, such voltage being less than the following voltages and being variable in amplitude to provide compensation in material switching characteristics with temperature changes.

18. The method of claim 13 wherein said time period greater than ts is a period selected from 1.5ts, 2.0ts, 2.5ts, 3.0ts.

19. A multiplex addressed ferroelectric liquid crystal matrix display comprising:

a liquid crystal cell comprising a layer of liquid crystal material contained between two cell walls carrying electrodes formed as a first set of electrodes on one cell wall and a second set of electrodes on the other cell wall, the electrodes comprising a matrix of addressable intersections, at least one of the cell walls being surface treated to provide surface alignment to liquid crystal molecules along a single direction;

a strobe waveform generator for generating for each electrode in the first set of electrodes two non-blanking strobe waveforms of opposite polarity, wherein a blanking waveform is one in which all pixels along an electrode in the first set of electrodes are switched to a first display state irrespective of a data waveform applied to the electrodes in the second set of electrodes, each strobe waveform comprising a first pulse in a first time period having a duration of ts and a voltage level, said first pulse immediately followed by a second pulse in a second time period having a duration greater than ts and a voltage level of a greater amplitude than the voltage level during the first time period, a data waveform generator for generating two data waveforms of alternating positive and negative value pulses with one data waveform pulse the inverse of the other data waveform pulse, each data waveform pulse having a duration ts;

at least one driver circuit for applying one of said two non-blanking strobe waveforms separately to each electrode in the first set of electrodes in synchronism with said data waveforms with a time delay of 2ts between the start of strobe waveforms being applied to any two electrodes in the first set of electrodes until all electrodes in the first set of electrodes have received said one of said strobe waveforms, then applying the other of said two non-blanking strobe waveforms separately to each electrode in the first set of electrodes in synchronism with said data waveforms with a time delay of 2ts between the start of strobe waveforms being applied to any two electrodes in the first set of electrodes, at least one driver circuit for applying one of said two data waveforms for a time period of 2ts to each electrode in the second set of electrodes synchronized with the start of the strobe waveform applied to each electrode in the first set of electrodes, whereby each intersection is addressed with the resultant of said strobe waveform and appropriate data waveform to turn selected intersections to a desired display state once per complete display address period.

20. A multiplex addressed ferroelectric liquid crystal matrix display comprising:

- a liquid crystal cell comprised of a layer of liquid crystal material contained between two cell walls carrying electrodes formed as a first set of electrodes on one cell wall and a second set of electrodes on the other cell wall, the electrodes comprising a matrix of addressable intersections, at least one of the cell walls being surface treated to provide surface alignment to liquid crystal molecules along a single direction;
- a data waveform generator for generating two data waveforms of alternating positive and negative value pulses with one data waveform pulse the inverse of the other data waveform pulse, each data waveform pulse having a duration ts,
- a blanking waveform generator for generating for each electrode in the first set of electrodes a blanking waveform of duration greater than 1ts and an amplitude such that all pixels along an electrode in the first set of electrodes are switched to a first display state irrespective of which of said two data waveforms are applied to the electrodes in the second set of electrodes,
- a strobe waveform generator for generating for each electrode in the first set of electrodes a non-blanking strobe waveform comprising a first pulse in a first time period having a duration of its and a voltage level, said first pulse immediately followed by a second pulse in a second time period having a duration greater than its and a voltage level of a greater amplitude than the voltage level during the first time period,
- at least one driver circuit for applying said blanking waveform separately to each electrode in the first set of electrodes with a time delay of 2ts between the start of blanking waveforms being applied to any two electrodes in the first set of electrodes,
- at least one driver circuit for applying said strobe waveform separately to each electrode in the first set of electrodes in synchronism with said data waveforms with a time delay of 2ts between the start of strobe waveforms being applied to any two electrodes in the first set of electrodes, and
- at least one driver circuit for applying one of said two data waveforms for a time period of 2ts to each electrode in the second set of electrodes synchronized with the start of the strobe waveform applied to each electrode in the first set of electrodes, whereby each intersection is addressed with the resultant of said strobe waveform and appropriate data waveform to turn selected intersections to a desired display state once per complete display address period.

* * * * *